United States Patent [19]

Ziff et al.

[11] 4,399,371
[45] Aug. 16, 1983

[54] MODULAR WIRING SYSTEMS

[75] Inventors: Stephen J. Ziff, New York, N.Y.; Richard L. Sieron, Fairfield; William P. Shine, Monroe, both of Conn.

[73] Assignee: Dual-Lite, Inc., Newtown, Conn.

[21] Appl. No.: 297,512

[22] Filed: Aug. 28, 1981

Related U.S. Application Data

[63] Continuation of Ser. No. 929,455, Jul. 31, 1978, abandoned.

[51] Int. Cl.³ ............................ H02G 3/26; F21S 7/00
[52] U.S. Cl. .................................. 307/147; 339/147 R; 339/14 RP
[58] Field of Search ............................ 174/49, 48, 59; 307/147; 339/147 R, 276 T, 14 RP, 8 R, 130 C, 130 R, 125 R, 17 D, 127 R, 126 R

[56] References Cited

U.S. PATENT DOCUMENTS 3,112,150  11/1963  Hammell ...................... 174/84 L X

FOREIGN PATENT DOCUMENTS 2305873  3/1975  France ................................ 174/49

OTHER PUBLICATIONS

Dual Lite, Inc. Wiring Products Division, "Modular Wiring, Power Poles, Poke-Thru Devices", Jun. 1977.
"Reloc-A New Concept in Flexible Wiring" Jan. 1979.

Primary Examiner—G. Z. Rubinson
Assistant Examiner—James L. Dwyer
Attorney, Agent, or Firm—Mattern, Ware, Stoltz and Fressola

[57] ABSTRACT

A modular wiring system is disclosed for lighting and power distribution in office buildings, factories and the like. The modular wiring system utilizes a five-face connector assembly as its principal component for the distribution and control of power to lighting fixtures and power receptacles. The connector assemblies may be one of four types for providing different power configurations at the connector faces. The five-face connector assemblies all utilize the same housing and are economical to manufacture by using specially designed bus bars to obtain the desired power configurations and to provide the terminal connections. Other components of the wiring system mate with the five-face connector assembly to provide an efficient lighting or convenience power system which may be easily field modified.

30 Claims, 50 Drawing Figures

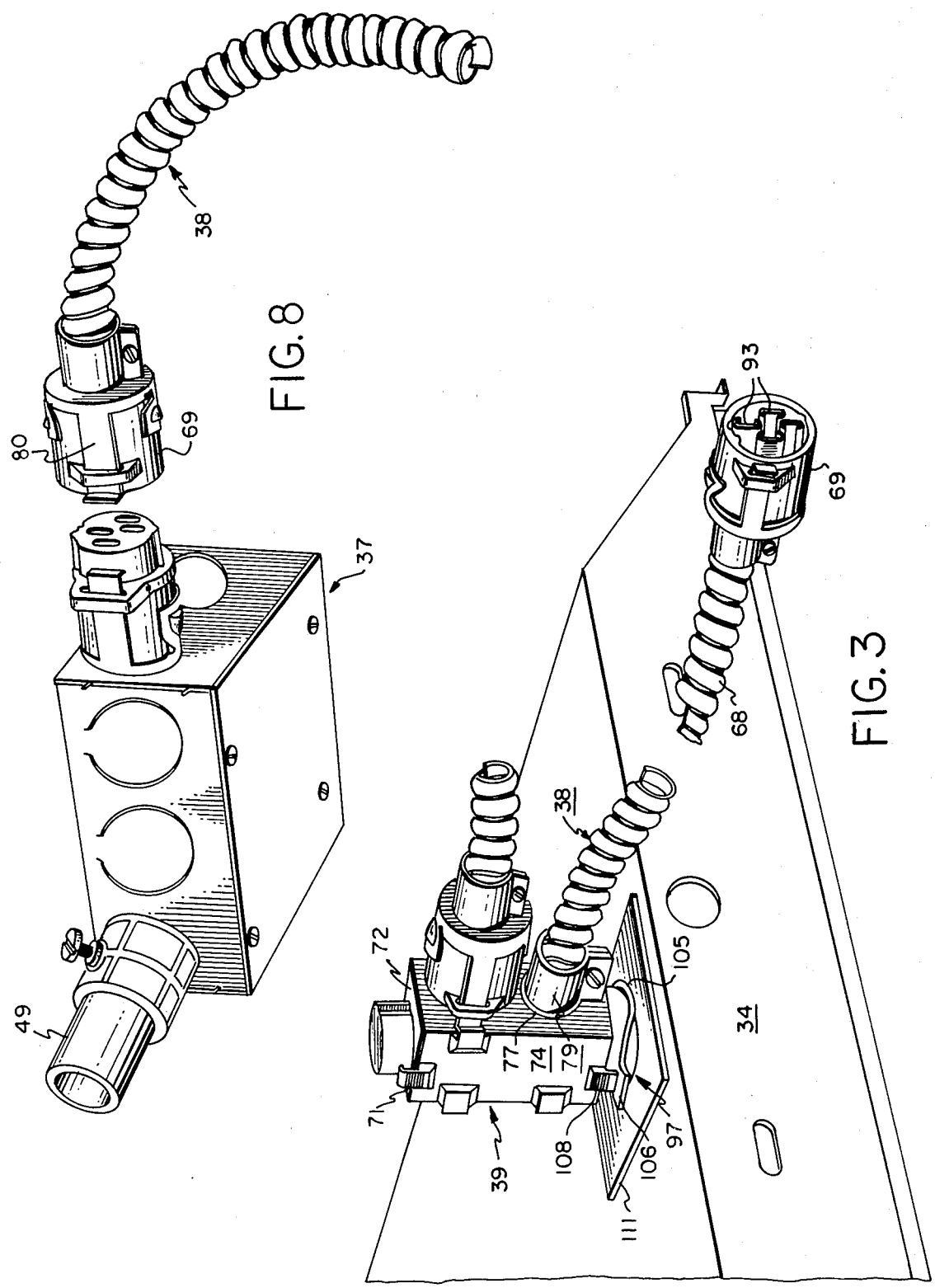

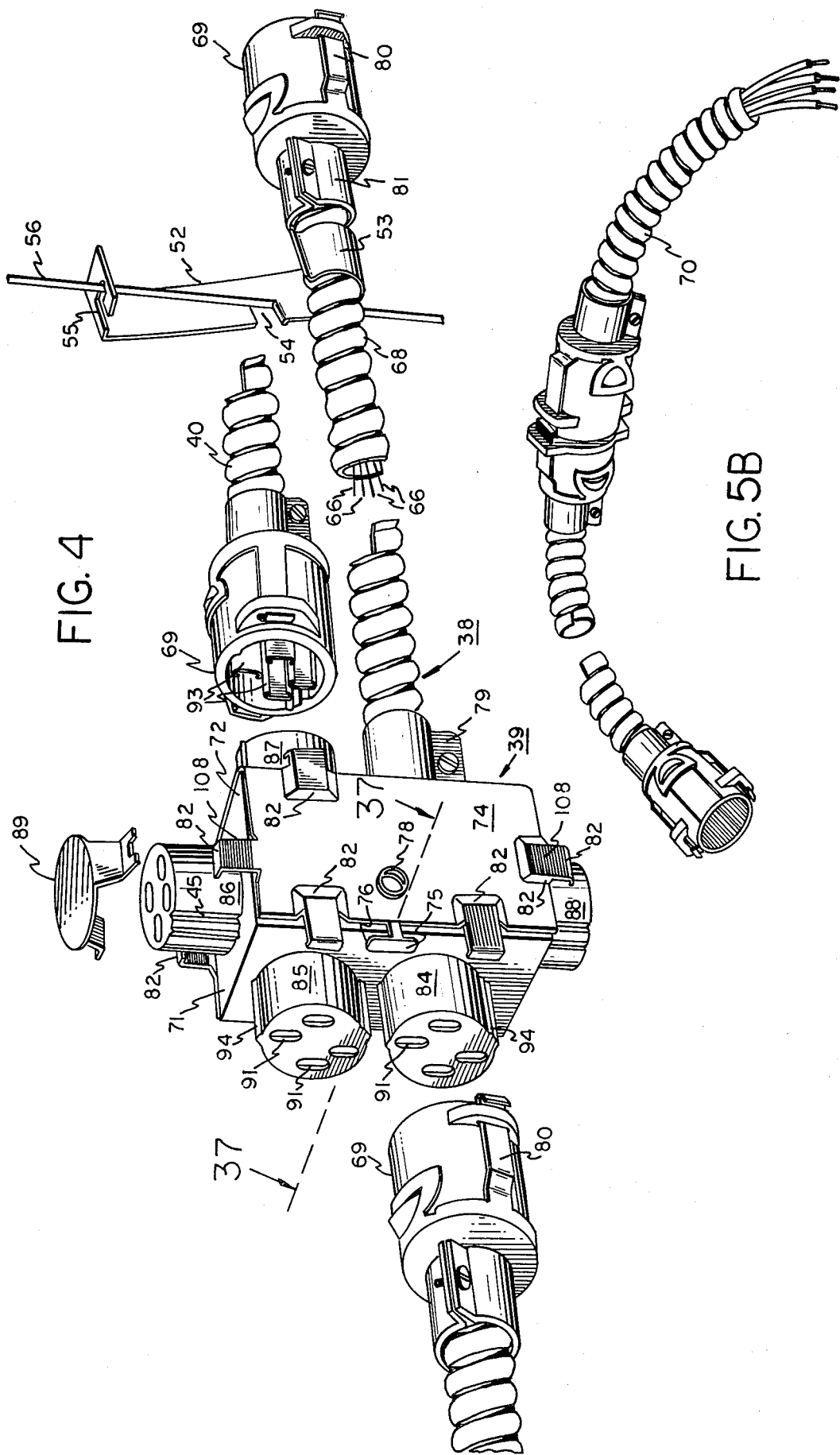

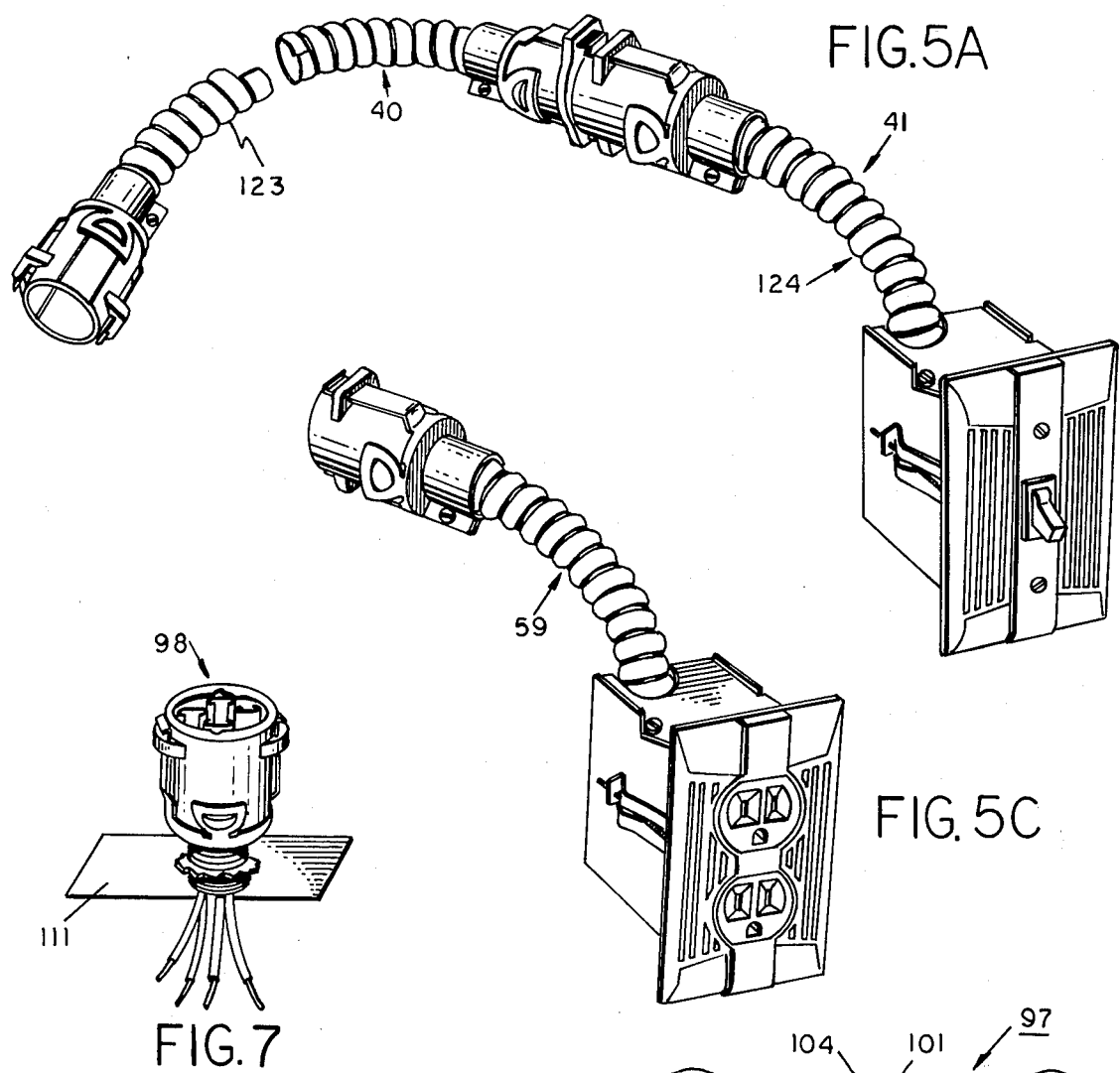
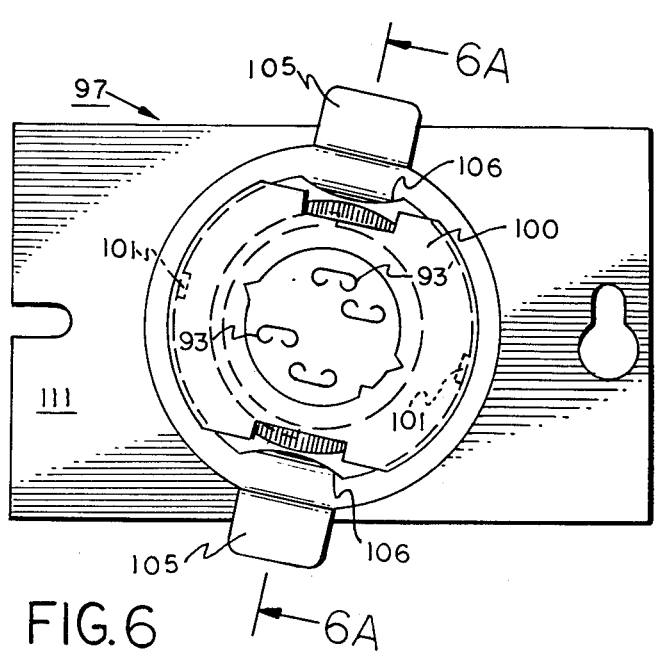

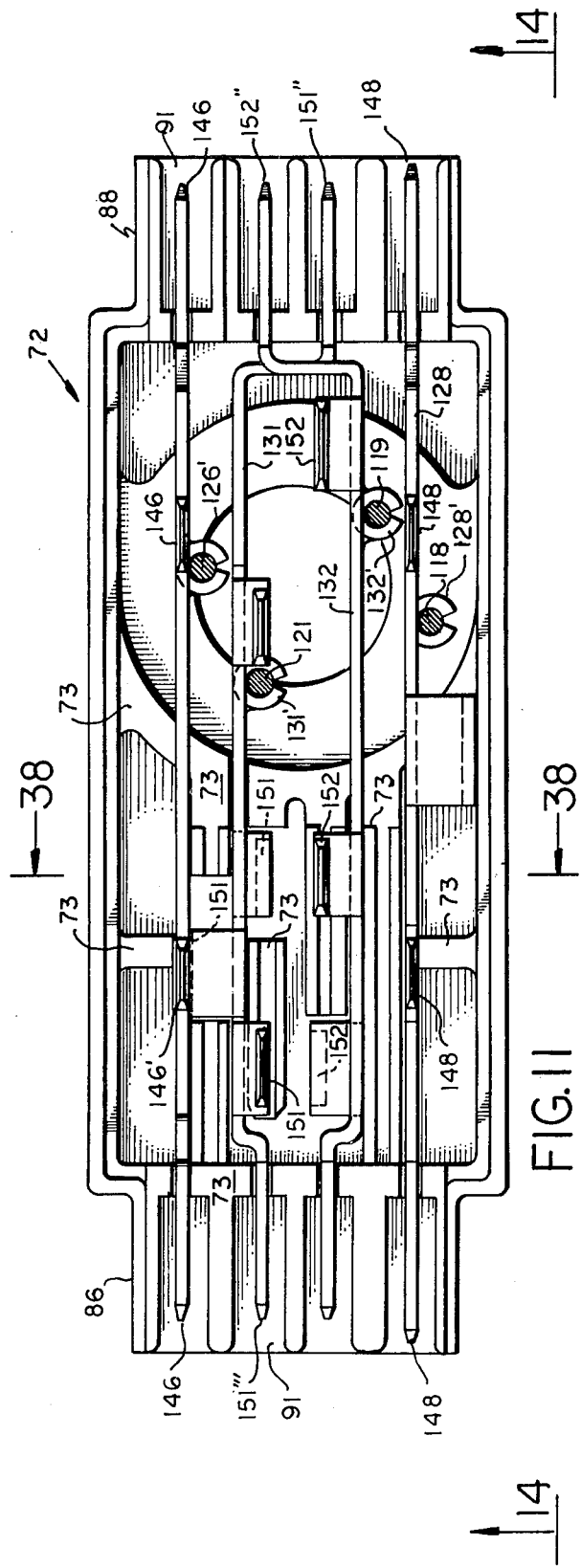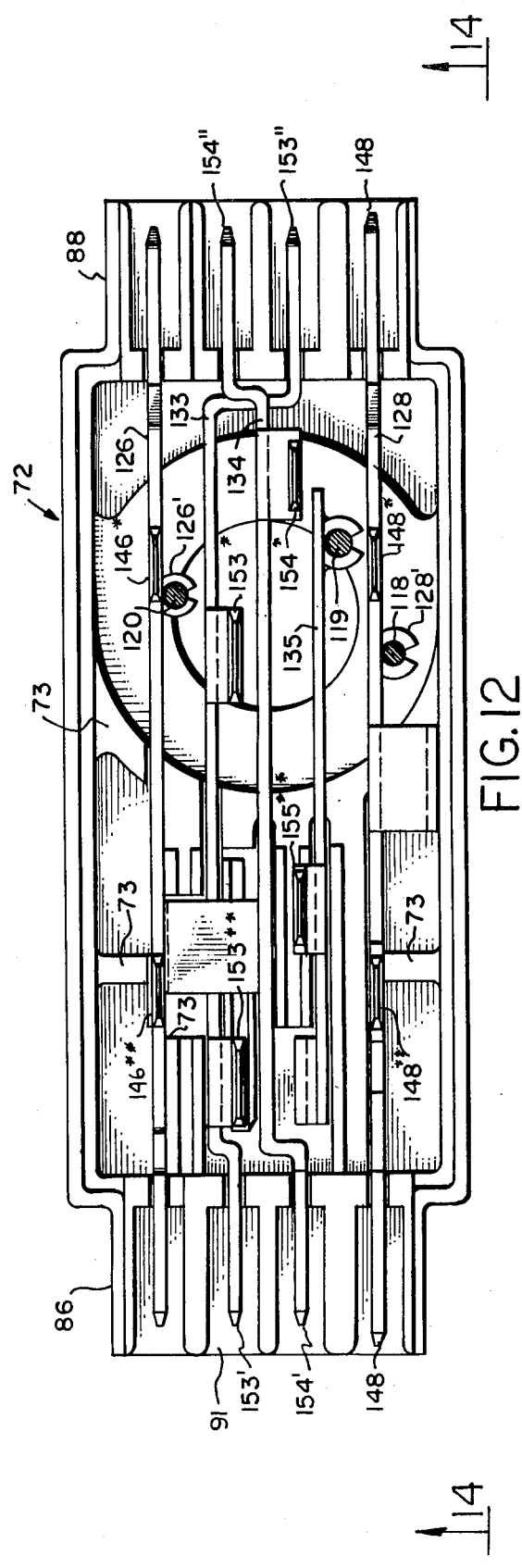
FIG.11
FIG.12

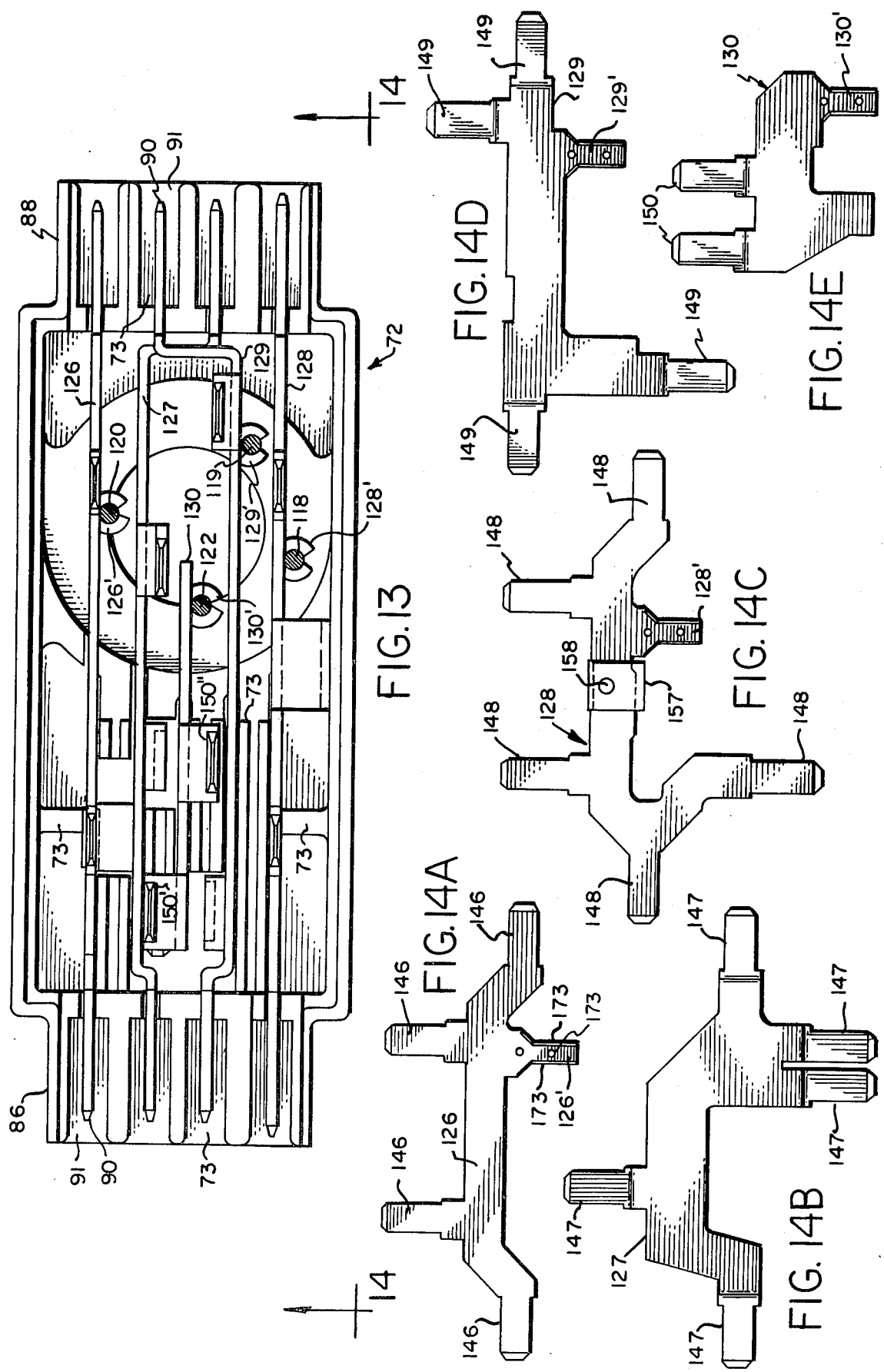

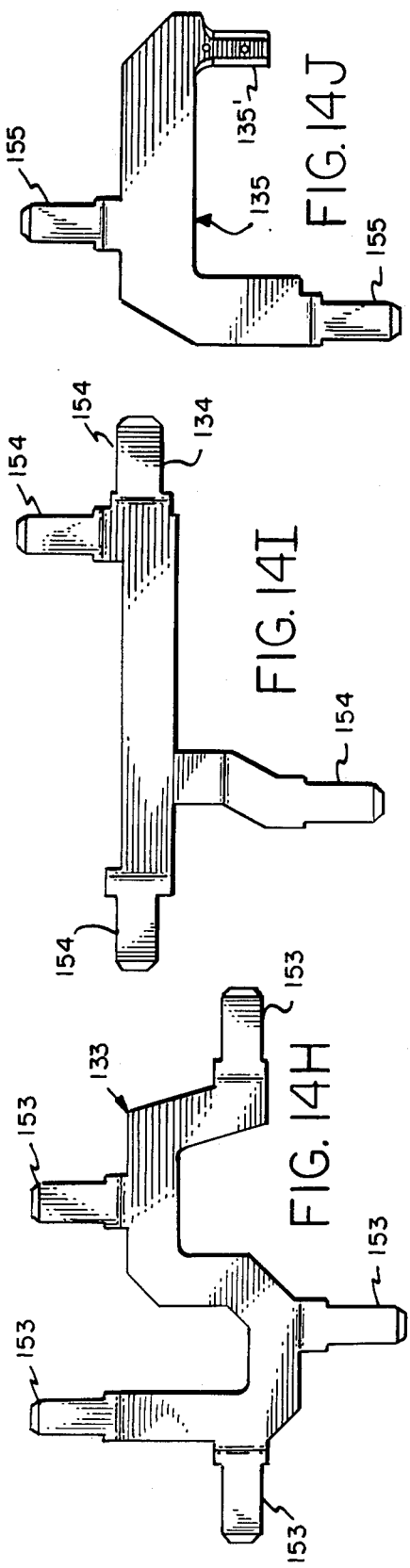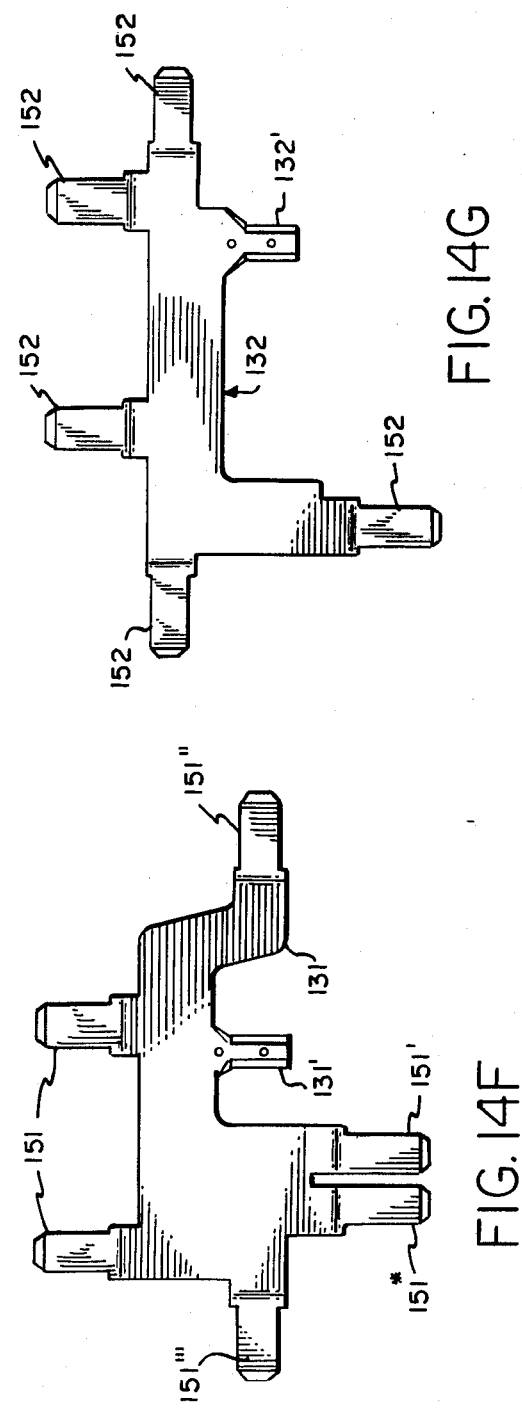

FIG.25
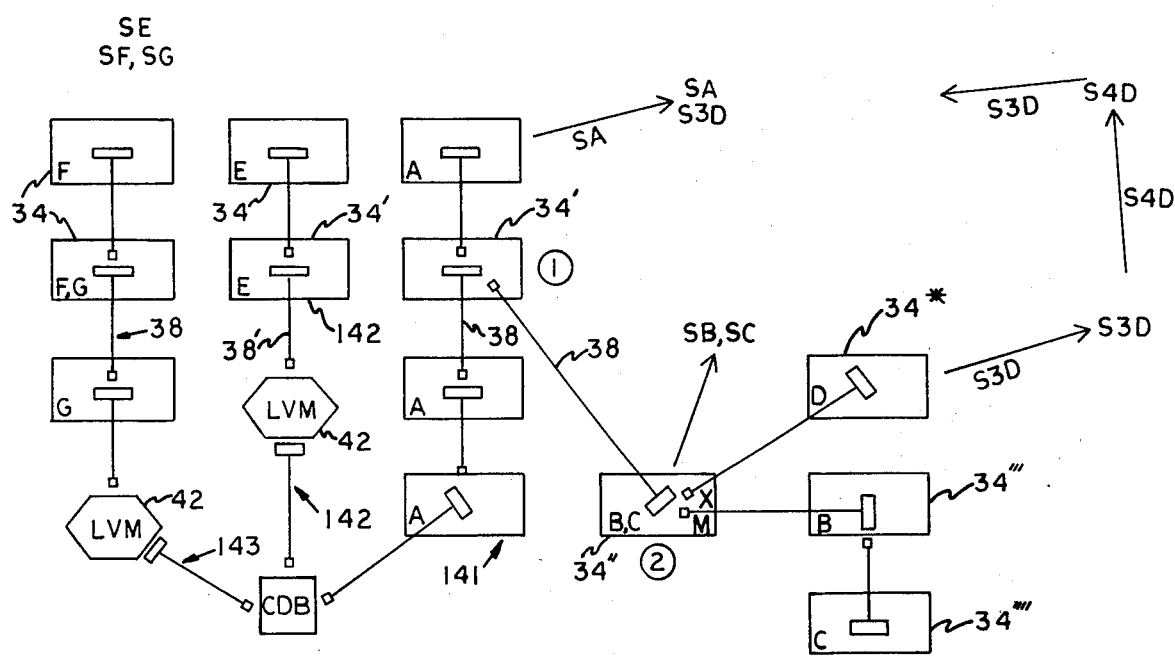
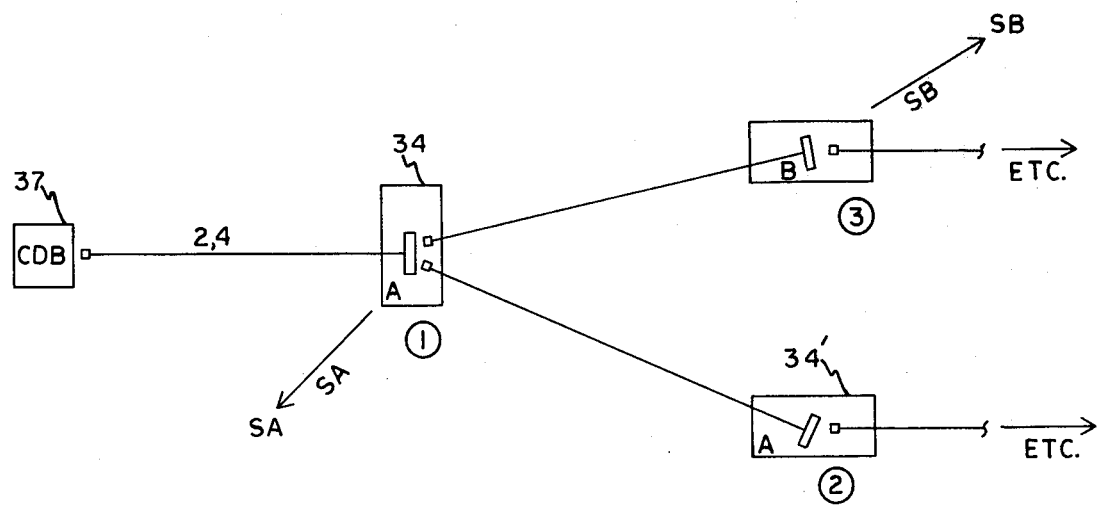
FIG. 26

FIG. 27
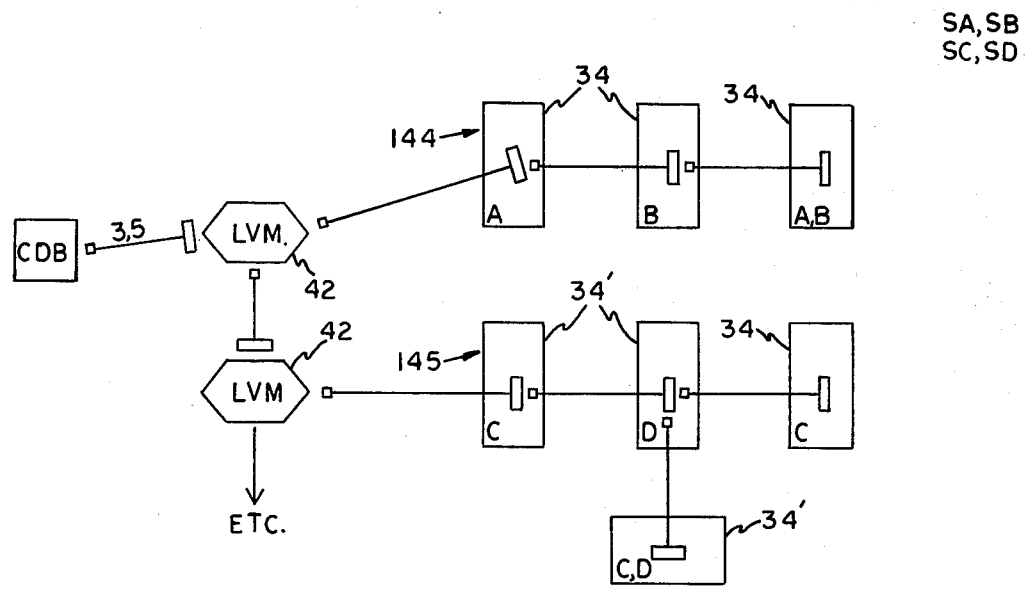
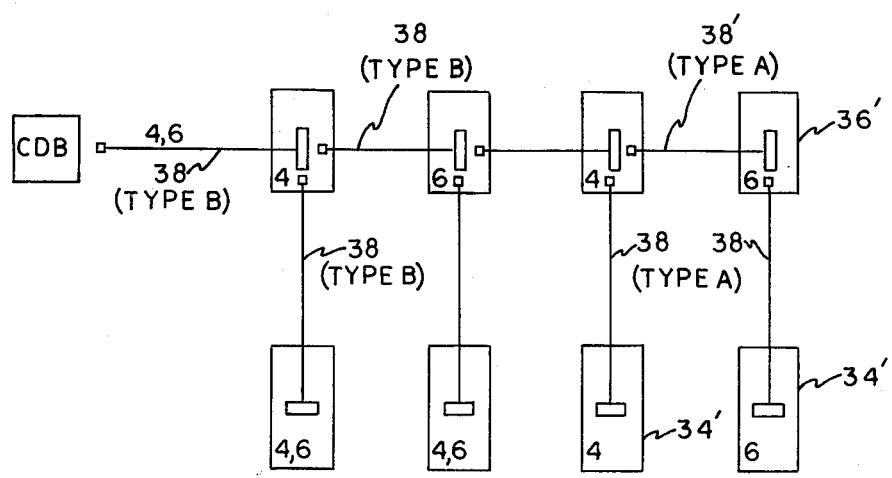
FIG. 28

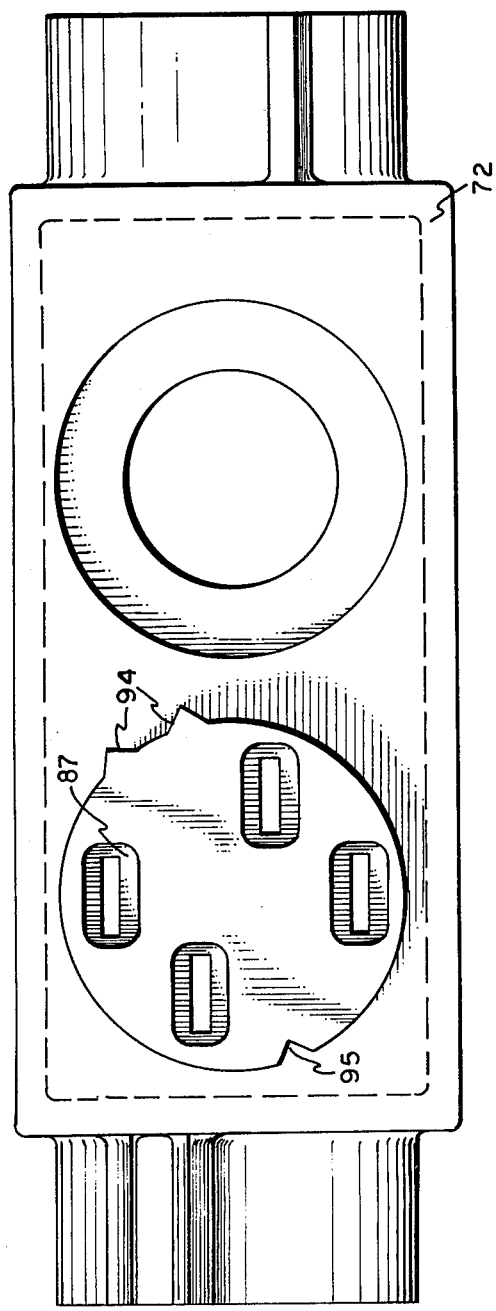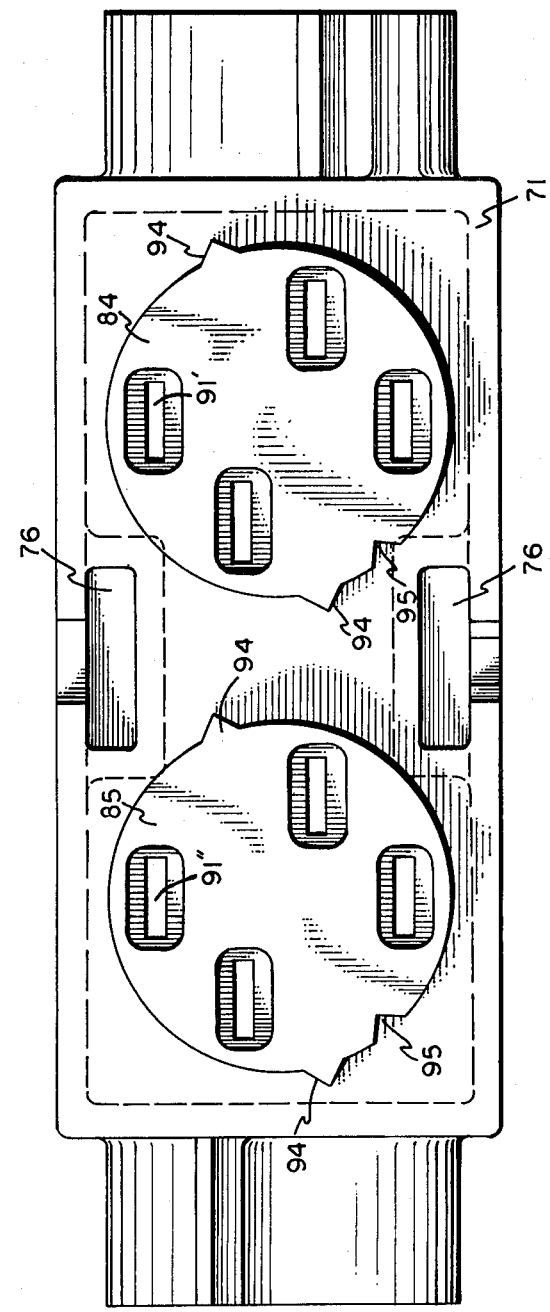

MODULAR WIRING SYSTEMS

This is a continuation of application Ser. No. 929,455 filed July 31, 1978, now abandoned.

TECHNICAL FIELD

The present invention relates to electrical modular wiring systems for the distribution of power to lighting fixtures and power receptacles used in office buildings, factories, and the like. This field is especially directed to such buildings utilizing a "false ceiling" wherein fluorescent or other lighting fixtures are placed along the "false ceiling" in the ceiling plenum with switches and utility power receptacles placed in partitioning walls, power poles, and floors.

BACKGROUND ART

The prior art patents and publications listed in Table 1 are directed to modulator wiring systems and lighting and power systems and are believed to be relevant with respect to the present invention. Copies of these references will be submitted to the Patent and Trademark Office in a Prior Art Statement.

TABLE 1

| Patent No. | Inventor | Date of Issue |
| --- | --- | --- |
| *United States Patents* | | |
| 324,551 | Goldenberg | 1885 |
| 2,122,819 | Lazich | 1938 |
| 2,162,864 | Rugg et al | 1939 |
| 2,292,394 | O'Brien | 1942 |
| 2,358,346 | O'Brien | 1944 |
| 2,484,092 | Hopgood | 1949 |
| 2,558,029 | Wood | 1951 |
| 2,576,165 | Wood | 1951 |
| 2,611,800 | Naughton | 1952 |
| 2,894,097 | Bassin | 1959 |
| 2,933,550 | Cole et al | 1960 |
| 3,004,175 | Weiss | 1961 |
| 3,082,290 | Ohmit | 1963 |
| 3,144,502 | Weiss | 1964 |
| 3,235,771 | Schwartz | 1966 |
| 3,377,488 | Lorenzo | 1968 |
| 3,247,368 | McHugh | 1966 |
| 3,377,488 | Lorenzo | 1968 |
| 3,461,220 | Hukin | 1969 |
| 3,474,384 | Quackenbush | 1969 |
| 3,504,169 | Freeburger | 1970 |
| 3,564,234 | Phlieger, Jr. | 1971 |
| 3,609,629 | Tenery | 1971 |
| 3,683,100 | Deal et al | 1972 |
| 3,683,101 | Liberman | 1972 |
| 3,708,608 | Wyman | 1973 |
| 3,715,627 | D'Ausilio | 1973 |
| 3,719,768 | Jonsson | 1973 |
| 3,809,969 | Williams | 1974 |
| 3,909,503 | Bird | 1975 |
| 3,909,912 | Kiesling | 1975 |
| 4,001,571 | Martin | 1977 |
| RE 29,214 | Schultz | 1977 |
| *Foreign Art* | | |
| *United Kingdom* | | |
| 390,022 | Bertele | 1933 |
| 489,644 | Erricker | 1938 |
| 618,701 | Lorimer | 1949 |
| 640,707 | Havlicek | 1950 |
| 1,232,953 | De Gialluly | 1971 |
| 1,344,186 | Breitmeir | 1974 |
| *Japan* | | |
| 48-15094 | Hitachi Ltd. | 1973 |
| *Other Publications* | | |
| Advertising Brochures: | | |
| General Cable Corp. | "Porta Ve Lite-Lines" | |
| Daniel Woodhead Co. | "PROTEX ® String Lights" | |
| Royal Electric ITT | "Triple Outlet Adapter Cordset" | |
| Hubbell | "4-Adapters and Spiders" | |
| Daniel Woodhead Co. | "Distribution Equipment" | |

DISCLOSURE OF INVENTION

Although relevant, it is submitted that none of the cited references alone or in combination with each other disclose or suggest the inventive features of the present invention. In particular, although many of these references are directed to modular wiring systems for distributing power in buildings and the like, none of these references disclose or suggest a five-face connector assembly for the distribution of power in one of a number of predetermined ways. Thus, although the Martin patent discloses multi-conductor cables with connectors on each end for powering lighting fixtures in a parallel arrangement and the use of various "adapters" for switching or converting the function of the power to the lighting fixtures, it does not disclose or suggest a five-face connector assembly which can not only pass power to a lighting fixture but can also switch the power to the lighting fixture and pass power, switched power, or different power circuits of multi-circuit power lines to subsequent lighting fixtures or outlet receptacles interconnected by additional five-face connector assemblies. In short, none of the prior art references use or suggest the concept of a multi-face connector with multi-function power.

Also none of the references disclose or suggest a multi-face connector which uses bus bars to obtain the desired power configuration at the face connector and which provide the power take-off terminals. This fact is extremely important since it eliminates many individuals connector terminals which are otherwise necessary. The bus bars therefore provide a significantly less expensive end product with corresponding savings in fabrication labor.

Furthermore, none of the prior art references disclose or suggest fixture receptacles which are recessed into the surface of the lighting fixture and which can rotate 180° in order to allow easy interconnection with a mating incoming connector. This eliminates mechanical twisting or torsional stresses found in some of the prior art modular wiring systems.

In addition, none of the prior art references disclose or suggest a single five-face connector housing formed from molded plastic and slotted for insertion of one of a number of different types of bus bars which, depending upon the type and placement of these bus bars in the slots, causes the resultant connector assembly to have one of four different lighting or power functions. This housing also incorporates an external metal sheath for protecting the molded portions as well as to provide positive mechanical locking of all interconnecting cables while maintaining strain relief for the electrical connections.

The five-face connector assemblies as well as the other cables utilized in the modular wiring system incorporate a unique terminal and bus bar lug which can receive solid conductor wire and provide a non-loosening, secure mechanical and electrical connection to the wire even if the wire is twisted. These wire to terminal connections are achieved by a crimping technique which has application in any wiring field where solid conductor wire is to be connected to a terminal.

Further, the female terminals utilized in the present modular wiring system have a barrel type connecting end with cutouts formed therein which reduce the flexing spring stress of the terminal while allowing greater displacement of the terminal before permanent set deflection occurs. This modification in the female terminals enables them to be used in modular wiring systems where multiple insertion and removal of connectors is possible. Such insertions and removals could otherwise cause faulty electrical connections due to poor contact between the female terminal and the mating male tab.

BRIEF DESCRIPTION OF DRAWINGS

FIG. 3 is a partially cut-away perspective view of a five-face connector assembly with a switch cable connected and showing the assembly connected to a fluorescent fixture by a low profile rotatable fixture receptacle;

FIG. 4 is a partially cut-away perspective view of the five-face connector assembly showing alignment at one of its power out faces with the cable connector and of the next connector assembly, alignment with a switch cable at its switch-face connector, as well as showing a cable clamp support for use in supporting the five-face connector assembly to a suspended ceiling strut;

FIG. 5A is a perspective view of a switch assembly and a switch cable for interconnecting with the switch-face connector of the five-face connector assembly;

FIG. 5B is a perspective view of a whip-end cable set for interconnection with a standard switch and a switch cable for interconnection to the switch-face connector of the five-face connector assembly;

FIG. 5C is a perspective view of a pre-wired duplex receptacle assembly for use in convenience power applications which can also mate with a power cable similar or identical to the switch cable shown in FIGS. 5A and 5B;

FIG. 6 is a top plan view of a flush-mounted fixture receptacle capable of being rotated 180°;

FIG. 6A is a cross-sectional view of the receptacle shown in FIG. 6 taken along line 6A—6A;

FIG. 7 is a perspective view of another embodiment of a fixture receptacle which surface-mounts to the fixture;

FIG. 8 is a perspective view of a ceiling distribution box for providing interconnecting power from a lighting distribution panel to one or more five-face connector assemblies;

FIG. 11 is a plan view of one-half of the five-face connector plastic housing showing the bus bar arrangement for a type A or type B five-face connector assembly;

FIG. 12 is a plan view similar to FIG. 11 showing the bus bar arrangement for a type C five-face connector assembly;

FIG. 13 is a plan view similar to FIGS. 11 and 12 showing the bus bar arrangement for a type D five-face connector assembly;

FIGS. 14A, B, C, D, E, F, G, H, I and J are side elevational views taken along lines 14—14 in FIGS. 11, 12 and 13 of the various bus bars utilized in the different types of five-face connector assemblies of the present invention;

FIG. 25 is a diagrammatic view of local switching of single circuit lighting power in which the ceiling distribution panel provides power to three lines of fixtures, two of which are switchably controlled by low voltage switching modules (LVM) and also showing the tapping of power from one of the fixtures of the third line of fixtures to another fixture having dual switching and having power from this fixture directed to two additional fixture lines;

FIG. 26 is a diagrammatic view of local switching of two circuit lighting;

FIG. 27 is a diagrammatic view of a special two-circuit lighting arrangement utilizing multiple LVM's to provide switching of both circuits of the two circuit lighting power to individual strings of lighting fixtures;

FIG. 28 is a diagrammatic view of unswitched two-circuit lighting where each fixture may have a dual ballast;

FIG. 31 is a side-elevational view of the housing of the five-face connector illustrating the switch face connector, its keying arrangement and terminal recess locations, and also showing the recess for receiving a clamp at the end of the conductor cable forming a part of the five-face connector assembly;

FIG. 32 is a side-elevational view of the housing of the five-face connector illustrating the two power out connector faces of the five-face connector, their keying arrangement and terminal recess locations;

BEST MODE IN CARRYING OUT THE INVENTION

Figure 1:
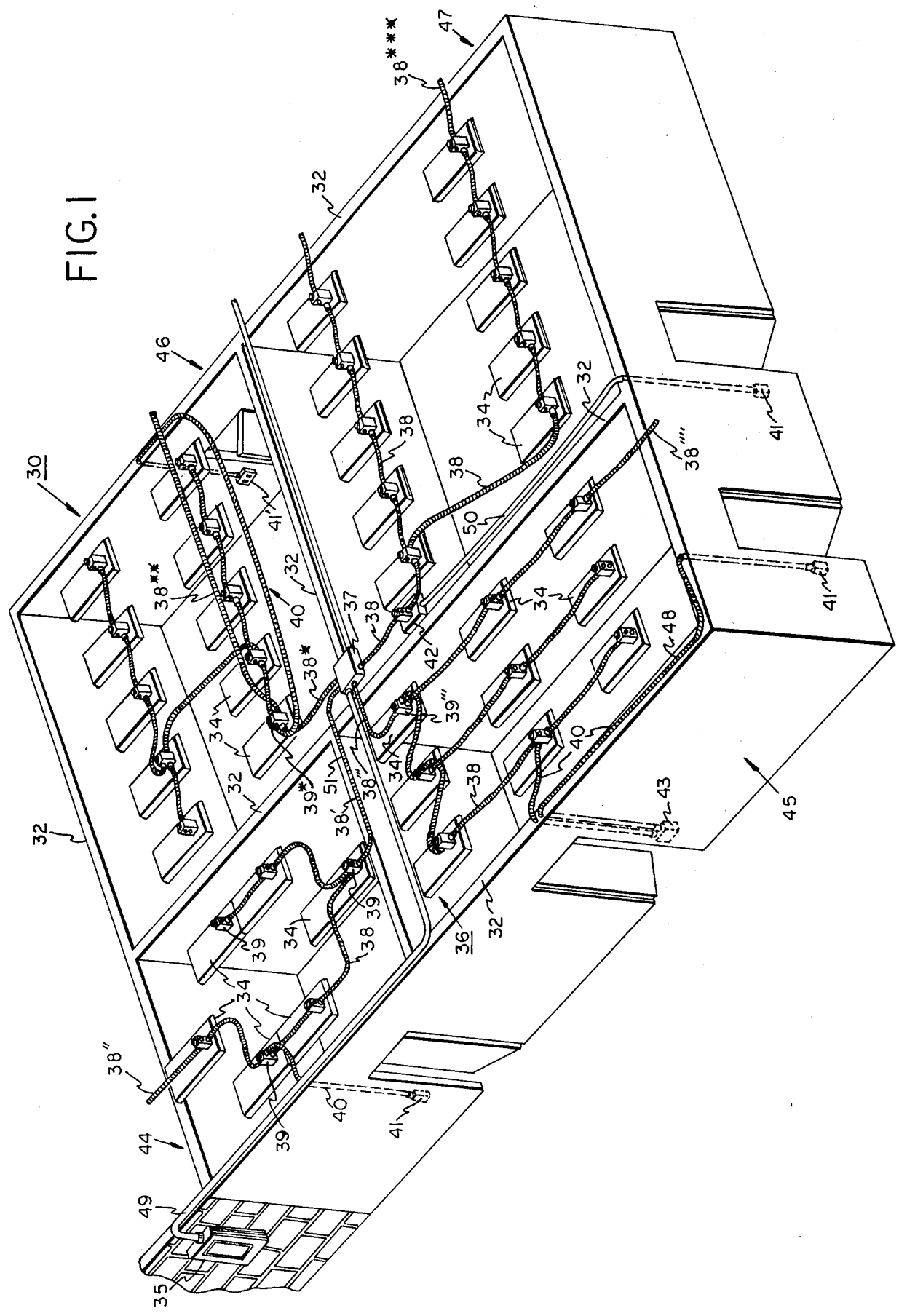
FIG. 1 is a perspective diagrammatic view of a modular wiring system according to the present invention for supplying electrical power to fluorescent fixtures in a building.

The best mode for carrying out the present invention is shown in FIGS. 1-38 of the present application. More particularly, FIG. 1 illustrates a portion of a typical office building 30 utilizing a modular wiring system according to the present invention to illuminate the various offices. The offices are formed by means of partitions 32 and have a suspended ceiling (not shown) supporting lighting fixtures 34.

A modulator wiring system 36 according to the present invention is provided to supply electrical power and switching of this electrical power to the fluorescent fixtures in various power configurations. This modular wiring system comprises a lighting distribution panel 35, a ceiling distribution box 37, various types of five-face connector assemblies 38, switch cables 40, wall switches or switch assemblies 41 and 43, a low voltage switching module (LVM) 42 and LVM control conductors 50.

For lighting applications the modular wiring system is normally used to power single or dual ballast lighting fixtures 34 (see FIG. 1) or pre-wired incandescent fixtures 33 (see FIG. 10), or high intensity discharge (HID) fixtures.

The Five-Face Connector Assembly

As shown in FIGS. 3 and 4, the five-face connector assembly 38 comprises a power in connector 69 with latching fingers 80 and female barrel type terminals 93, an armored cable 68 enclosing a series of conductors 66 connected to terminals 93, a clamp 79 connected to a five-face connector 39 at orifice 77 in the armored metal jacket 74 surrounding the two molded halves 71 and 72 forming the five-face connector housing with its five-face connectors 84, 85, 86, 87, and 88. A dust cap 89 can be placed over any unused connector face.

Connector 88 is called the "S" face or "S" face connector and is used for passing switching power to a mating fixture receptacle. Connector 86, called the "U" face or "U" face connector, is used for passing unswitched power to a mating fixture receptacle. Connector 87 is called the "switch face" or "switch face connector" and is used for mating with switch cable 40 which in turn mates with a switch assembly 41 (see FIG. 5A) or, through a whip end cable 70 (see FIG. 5B) to a standard wall switch. Connector 85 is called the "M" or "X" power out face or power out face connector and is used for connection to the power in connector 69 of an adjacent five-face connector assembly so as to pass power to this other connector assembly. Similarly, connector 84 called the "M" face or "M" face connector is used for connection to an adjacent five-face connector assembly's power in connector 69 so as to provide it power.

As will be described in more detail later, there are four different types of five-face connector assemblies called Type A, B, C, and D. Each type performs a different power distribution function. They all use the same housing with their different electrical configurations achieved by use of different bus bars. Basically, the Type A connector assembly is for introduction of power to a branch or line of fixtures to be controlled by the same switch. The Type B connector assembly is generally used for connecting adjacent fixtures in the same branch. The Type C connector assembly is for providing dual switching of a single power circuit. Finally, the Type D connector assembly is for introducing dual circuit power to two branched lighting fixtures.

In convenience power applications, only Type A and Type B connector assemblies are used for the distribution of single circuit and dual circuit power to power receptacles and the like.

Five-Face Connector Assembly External Mechanical Aspects

As best seen in FIGS. 3 and 4, the five-face connector assemblies 38 of the present invention have a five-face connector 39 at one end, an interconnecting armored cable 68 surrounding conductors 66 which terminate in a dead fronted female connector 69. The five-face connector 39 comprises two molded halves 71 and 72 preferably made from a plastic such as thermosetting polyester material. An armored metal jacket 74 attaches to and clamps molded pieces 71 and 72 together by means of two T-shaped tabs 75 (one shown in FIG. 4) bent around into molded recesses 76 (see also FIG. 32) formed in molded halves 71 and 72. A grounding screw 78 is provided for making electrical contact between the metal jacket 74 and the ground bus bar 128 (see FIGS. 11-13 and 14C) of the five-face connector. This insures that the armored cable 68 is also at the ground potential since it is interconnected to the armored jacket 74 by means of clamp 79. Also, the ground conductor 66 can be eliminated if desired by the armored cable 68 acting as its substitute.

Likewise, connector 69 incorporates two metal fingers 80 which are also electrically connected to the armored cable 68 by means of clamp 81. These metal fingers in turn are used for making mechanical and electrical connection to the adjoining connector and thereby maintain ground potential throughout all of the outer metal parts of the entire modular wiring system.

The armored jacket 74 also incorporates metal fingers 82 which are designed for locking engagement with metal fingers 80 on the interconnecting connectors 69. Thus, mechanical stress from mating connectors with the five-face connector 39 is passed through the armored jacket 74 without being imparted to the molded halves 71 and 72. This is advantageous since it protects the molded halves as well as the bus bars contained therein.

Each face 84, 85, 86, 87 and 88 of the five-face connector incorporates male blade terminals 90 (see FIGS. 11, 12, 13 and 14) formed at the ends of bus bars 126–135 within molded recesses 91. Likewise, each connector 69 which mates with any of these faces of the five-face connector incorporates female lugs 93 which in turn mate with male terminals 90.

As best seen in FIGS. 29–32, each face of the five-face connector 39 incorporates ridges and notches 94 and 95 to insure that only connectors of the proper type are able to interconnect with a particular face. This insures that faces 86 and 88 only mate with connectors for use with lighting fixtures, that faces 84 and 85 only mate with connectors of other five-face connector assemblies and that face 87 only connects with connectors designed for interconnecting with switches. In addition, the ridges and notches for the modular wiring systems are different depending upon whether they are to service 120 VAC power or 277 VAC power.

As shown in FIGS. 3, 6, 6A, 7 and 10, five-face connector 39 is designed for mating at its "U" and "S" faces 86 and 88 with fixture receptacles 97 and 98. Fixture receptacle 97 is flush mounted to lighting fixture 34 as shown in FIG. 3. This fixture receptacle encompasses a connector 100 having female lugs 93. Similar female lugs 93, as shown in FIG. 3, are incorporated into connector 69. The notched portion 101 in the upper ring 102 of this connector mates with an upstanding tab 104 in latching spring 105.

As seen in FIGS. 3 and 6, the latching spring has upstanding wings 106 which resiliently engage with grooves 108 of metal fingers 82 of armored jacket 74. This insures a mechanical latch between the five-face connector 39 and the fixture receptacle 97 while maintaining a low-profile.

The fixture receptacle 97 is captured to the fluorescent fixture 34 by means of a retaining spring 110 which is mounted beneath plate 111 secured to the lighting fixture 34.

As also best seen in FIGS. 6 and 6A, the connector 100 may rotate with respect to the lighting fixture 34 (FIG. 3) a full 180 degrees. This is accomplished by means of a half ring 115 which prevents movement with respect to plate 111 by contacting the radially inwardly protruding tab 116 at either termination of the half ring. By allowing connector 102 to rotate 180° the five-face connector "S" or "U" face can mate with this connector without the need for a large loop in BX cable 68. Such a loop could otherwise occur if connector 102 was not properly oriented with respect to the line of connector assemblies 38. It should be noted that by restricting the connector rotation to 180°, ballast connecting conductors 104 cannot become twisted. It should further be noted that four such conductors are shown in FIGS. 6 and 7 representing two ballast fixtures and including a neutral and ground conductor. If the fixture has only a single ballast, one of the circuit lines 104' would be removed from the fixture receptacle. The field mountable fixture receptacle 98 shown in FIG. 7 does not need to rotate since the electrician can tighten it to the fixture with the proper orientation.

Typical Lighting and Convenience Power Installations

In room 44, local switching of six fixtures 38 is accomplished using a Type A five-face connector assembly 38' plugging into the ceiling distribution box 37 at its cable connector end 51 and a fluorescent lighting fixture 34' at its five-face connector end. From this first fixture, Type B five-face connector assemblies 38 are plugged into the first five-face connector assembly 38' and to each other so as to power the remaining fluorescent fixtures 34. From any five-face connector 39 forming one end of the five-face connector assembly 38, a switch cable 40 may be interconnected. This switch cable terminates in a wall switch assembly 41 which then controls the power to each fluorescent fixture 34 and 34' within room 44. To connect another group of fixtures to this circuit within room 44, another Type A connector assembly 38" is plugged into the output face in the last fixture of the chain. This Type A connector assemblies carries power but breaks the switching circuit for room 44 and allows other local switching functions to be introduced in the adjacent room.

In room 45, a three-way switching of nine fixtures is shown by plugging a type A connector assembly 38''' into the ceiling distribution box 37 and plugging its five-face connector 39''' into one of the fixtures 34. From this first fixture, type B connector assemblies are serially plugged to power the remaining fluorescent fixtures. From any of these fixtures a switch cable connection can be made from the switch face connector to a three-way switch 43. This three-way switch comprises two switches and interconnects with switch 41 to provide switching of the fixtures from either of the two shown locations. Switches 41 and 43 are interconnected to each other by means of a cable 48. The electrical wiring in such three-way switches is well known in the lighting art.

To connect another group of fixtures to the circuit powering the fixtures in room 45, a type A connector assembly 38'''' is plugged into the output face of the last fixture as shown. This again breaks the switching function for room 45 from the adjacent room and allows other local switching to be introduced in the lighting circuit of the adjacent room.

Room 46 illustrates local switching of alternate fixtures by means of a type C connector assembly 38* connected at one end to the ceiling distribution box 37 and its five-face connector 39 connected to one of the lighting fixtures. From this five-face connector 39*, type B cable assemblies are plugged into the remaining fixtures as shown. A switch cable 40 terminates in a double wall switch 41' for controlling the two conductors within type C connector assembly 38*. Alternate switching of the remaining fluorescent fixtures is accomplished by selecting either the unswitched (U) or switched (S) face connector 86 or 88 of the five-face connector assemblies 38. A type A connector assembly 38** is connected into the "X" output face 85 of the type C connector assembly to break the switching function for room 46 from adjacent rooms powered by the same lighting circuit. This allows other local switching functions to be introduced in the adjoining rooms.

Finally, room 47 illustrates the use of low voltage switching of ten lighting fixtures. In this arrangement, a low voltage switching assembly (LVM) 42 is electrically connected to the ceiling distribution panel by means of a type A connector assembly 38. Type B connector assemblies are serially plugged into the remaining fixtures. A low-voltage control pair 50 is run from the LVM module 42 to the local switch location 41. To connect another group of fixtures to the same lighting circuit, a type A connector assembly 38*** is connected into the output face of the last fixture in the lighting chain. This breaks the switching circuit for room 47 and allows other switching functions to be introduced in an adjacent room.

It should be noted that the five-face connector assemblies 38 can be supported from the ceiling above them by means of a cable clamp support 52 as shown in FIG. 4. which has a lower U-shaped portion 53 for holding the connector assembly 38 and two cutout portions 54 and 55 dimensioned to grasp the false ceiling strut wire 56 normally used to hold the framework supporting the false ceiling panels. This clamp arrangement thus provides an easy means for keeping the weight of the connector assemblies from being imparted to the false ceiling.

Figure 2:
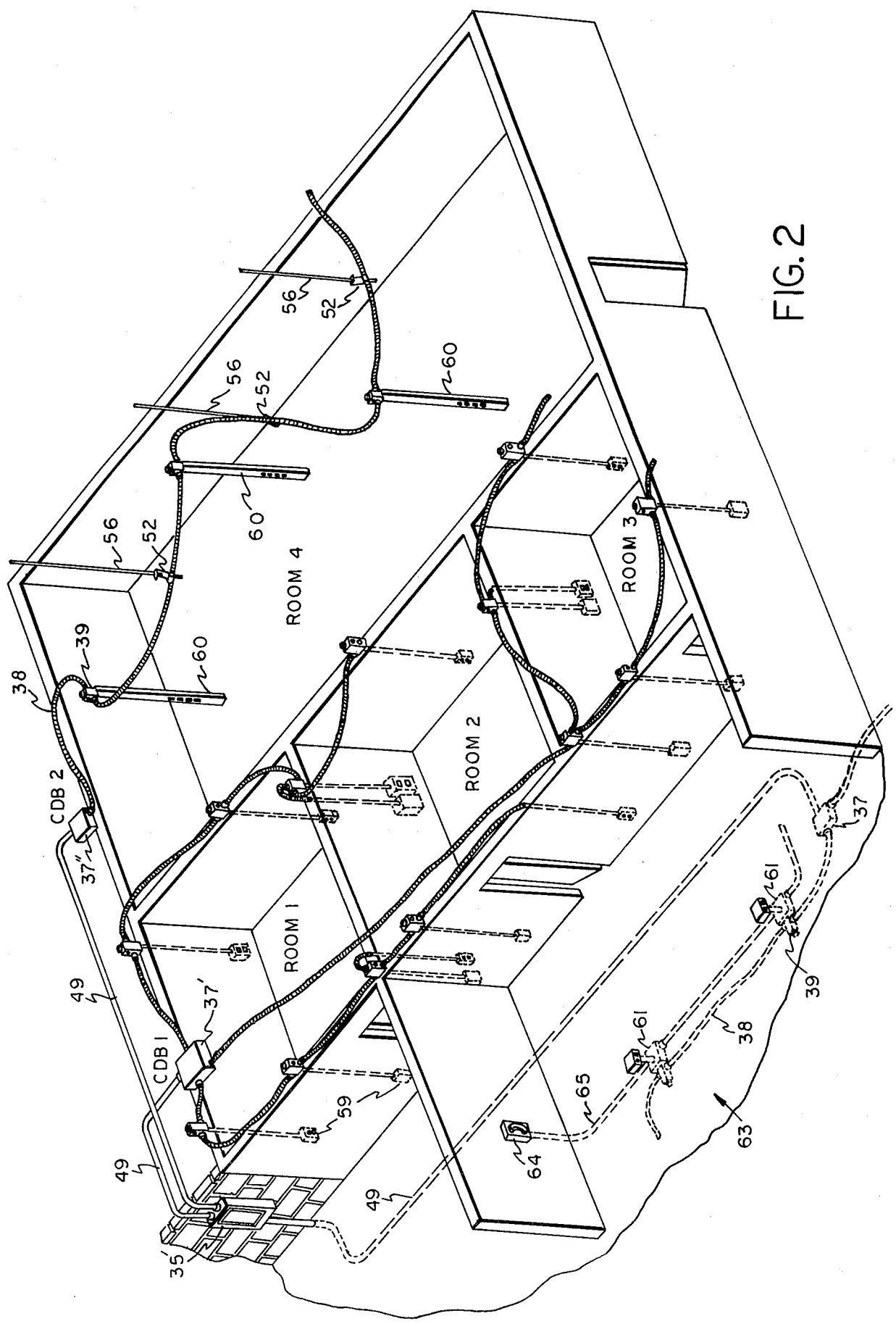
FIG. 2 is a perspective diagrammatic view of a modular wiring system according to the present invention for supplying electrical power to receptacle outlets in partitioning walls, power poles, and poke through devices located in a building.
Figure 10:
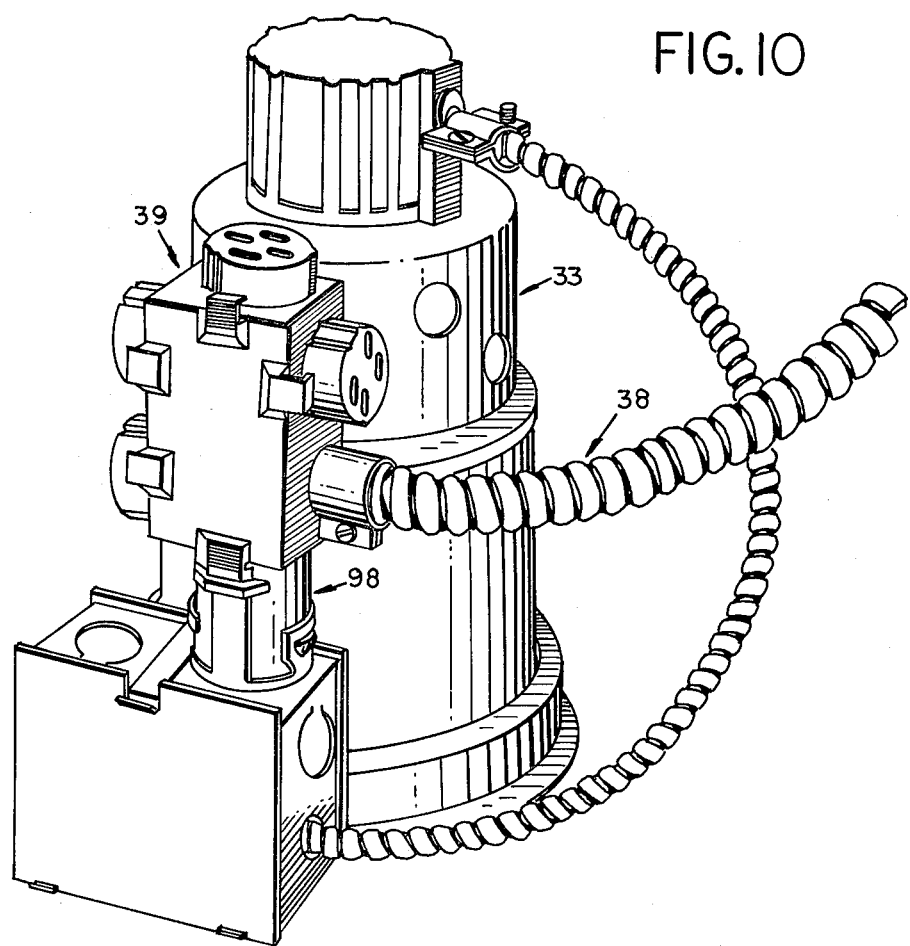
FIG. 10 is a perspective view of a five-face connector assembly interconnecting with an electrical box which interconnects to a pre-wired incandescent fixture with the dust cover removed from the incandescent fixture.
Figure 9:
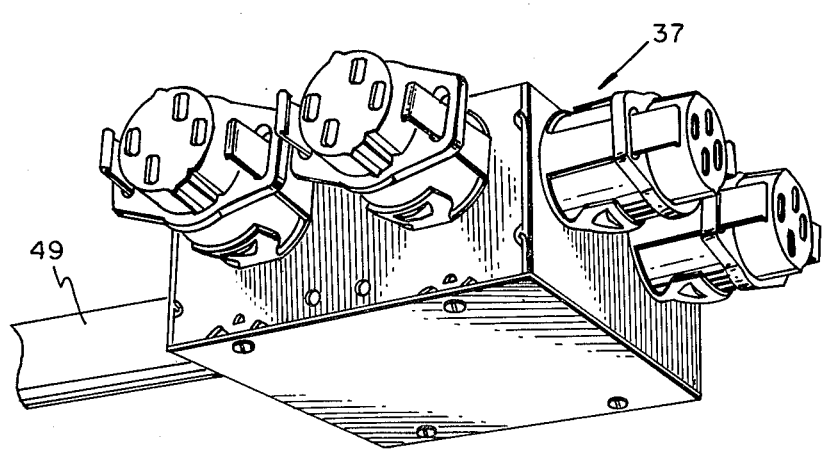
FIG. 9 is another embodiment of the ceiling distribution box having multiple output faces for interconnection with multiple five-face connector assemblies.

FIG. 2 is an illustration of the modular wiring system for three types of convenience power applications as distinguished from lighting applications. In these power applications, ceiling distribution boxes 37 are again used. They are powered from a power distribution panel 35' by means of conductor conduits 49. From the ceiling distribution panels five-face connector assemblies 38 are utilized to bring power to wall outlet receptacle assemblies 59, power poles 60 and poke through wiring devices 61.

As shown in FIG. 2, the wall outlet receptacles 59 in rooms 1 and 2 are connected in the same manner as the lighting fixtures shown in FIG. 1. Connectors to initiate the two-circuit layout for these rooms are installed in the ceiling distribution box 37'. Type B connector assemblies are plugged into the output faces of the ceiling distribution box. Connection to the receptacle assembly (see FIG. 5C) is made with a pre-wired double-ended cable 40 similar or identical to switch cable 40 (see FIGS. 5A and 5B). Other receptacle assemblies are connected in a similar manner with additional type B connector assemblies plugged into the power out faces of the previous five-face connector. Selection of the "S" or "U" face of the five-face connector insures proper circuit selection; that is, either the first or second circuit.

As shown in FIG. 2, room 3 is served from ceiling distribution box 37' which also powers rooms 1 and 2. As also shown in FIG. 2, room 63 has power distributed in it by means of poke-through wiring devices 61 which are energized from type B connector assemblies 38. The five-face connector 39 of these connector assemblies 38 plug into the wiring devices 61 to energize them. Selection of the "U" of "S" face of the five-face connector insures proper circuit selection. Thus, two circuits can be utilized through the same connector assembly. Provision for installation of telephone cable and connectors are available in the poke-through devices as shown by telephone 64 and conduit 65.

FIG. 2 also shows the energizing of power poles 60 in room 4 by means of type B connector assemblies. The first connector assembly 38 is plugged in ceiling distribution box 37" with its five-face connector 39 plugged into the first power pole. Selection of the "U" or "S" face on the five-face connector insures proper circuit selection. Thus, the power poles may be energized from one of the two circuits within the type B connector assembly. Provision for installation of telephone cable and connectors are available in the power poles.

It should be noted that the switch face of the five-face connectors utilized in the convenience power applications does not perform switching and is not utilized in power applications. Thus, the five-face connector assemblies when used in power applications are for purposes of distributing power in one or two circuit configurations without the switching of that power. The type A connector assembly is for the distribution of single circuit power only.

Electrical Operation of the Modular Wiring System

As is evident from FIG. 1, the modular wiring system of the present invention provides an easy, flexible way to provide power to lighting fixtures within a building in a manner to suit the needs of particular rooms or offices demarcated by partitioning walls. Although a number of prior art references previously cited are directed to achieving the same result, none of these references utilizes the basic component of the present invention, namely, a five-face connector assembly which, depending upon its type, provides different electrical circuit functions.

Figure 15:
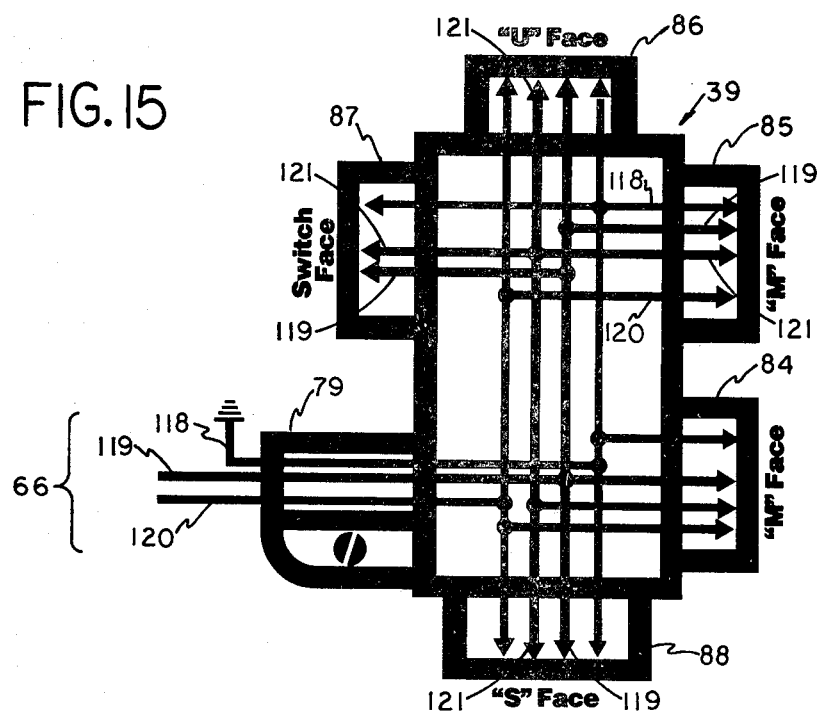
FIG. 15 is an electrical schematic, mechanically diagrammatic view of a type A five-face connector assembly.

A diagrammatic representation showing the electrical configuration of a type A five-face connector assembly is shown in FIG. 15. As is seen there, the armored cable conductors 66 comprise a ground line 118, a hot or power circuit line 119, and a neutral line 120 which are in turn electrically connected within connector 39 in the manner shown.

The electrical connections within the five-face connector 39 are made by a group of bus bars 126-135 (see FIGS. 14A-14J) but for the present purpose, the propagation of cable conductors to the connectors of the five-face connector will be discussed. The cable conductor nomenclature will also be used here. A thorough discussion of the bus bars appears later in the description.

Thus, the "S" face 88, the "M" face 84, the second "M" face 85, and the "U" face 86 all receive these three conductors at their terminations. The switch face connector 87 receives the hot line 119 and the ground line 118 and is interconnected to a switch lead 121 which in turn is interconnected with the "U," "S," and "M" face connectors. The switch face is interconnected with a switch so as to provide making and breaking the connection between conductors 119 and 121 and thereby provide switchable power to the remaining face connectors of the five-face connector 39. Thus, switchable power can be propagated along either of the "M" face connectors 84 and 85 to interconnecting five-face connector assemblies if that connector assembly is of a type (type B) providing interconnection with the four conductors 118, 119, 120 and 121. However, if another type "A" connector assembly is interconnected to either "M" face of a previous type "A" connector assembly, no electrical connection will be made to conductor 121 since the conductors within armored sheath 68 only provide for the three conductors shown, namely conductors 118, 119 and 120. Thus, the basic purpose for a type "A" connector assembly is to allow the electrical contractor to interconnect to a circuit which has switched power to lighting fixtures without having the switched power pass on to the next lighting circuit to be constructed. This provides great flexibility in the design and implementation of any desired lighting arrangement.

Referring to FIG. 1, it will be seen that in office 44, the fixtures 34 are switched by means of switch cable 40 and wall switch assembly 41. This switched power which affects each of the lighting fixtures within office 44 is not propagated to the next office if the five-face connector assembly 38" is of the type "A" variety.

Figure 19:
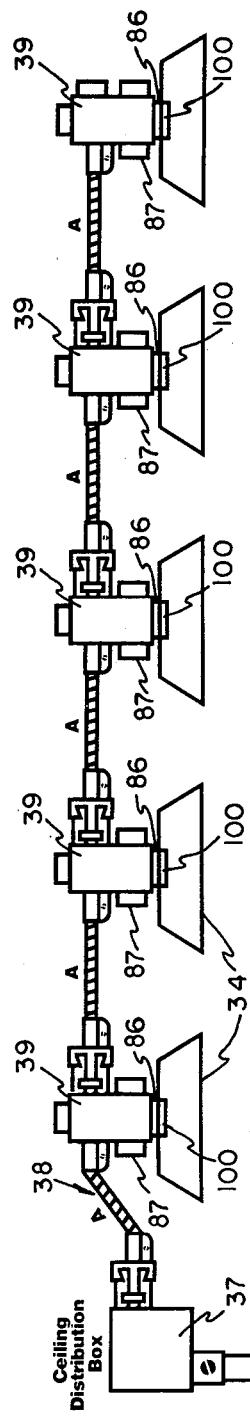
FIG. 19 is a diagrammatic view of a circuit breaker panel performing the switching of multiple fixtures.

As shown in FIG. 19, the type "A" connector assemblies can be utilized in tandem to provide energizing a number of lighting fixtures 34 which are in turn all controlled by the circuit breakers within lighting panel 35. The power in this panel is brought to the first type A assembly by ceiling distribution box 37. As shown in FIG. 19, the five-face connectors 39 of each five-face connector assembly has its unswitched face connector 86 mated with fixture receptacle connector 100. In this configuration, even if a switch cable and switch assembly were connected to switch face 87 of any of these connector assemblies, the switching function would not be imparted to the lighting fixtures. The reason for this is that the unswitched or "U" face connector 86, though having the switched conductor 121 brought to its termination, does not have this conductor mate with the female lugs within fixture receptacle connector 100 and thereby does not allow this switched power to be utilized by the lighting fixture. An understanding of how this is obtained is facilitated by observing FIGS. 6 and 6A where it is seen that the power lead 104' is removed for single ballast fixtures. Thus, when the "U" face connector 86 is mated with receptacle 100, the switch connector 121 mates with a terminal lug 93' within the receptacle 100 that is not connected to the lamp circuits.

When the "S" face 82 is interconnected with receptacle 100, the reverse is true. That is, the switch conductor 121 is connected to power the fluorescent fixture and the unswitched conductor 119, though mechanically connecting to terminal 93' within the receptacle, does not pass power to the fixture since this receptacle does not have a corresponding conductor (104') emanating from it. Thus, it is apparent that terminal 93' which mates with the switch conductor blade terminal of "U" face connector 86 mates with the unswitched conductor 121 blade terminal for "S" face connector 83.

The type A connector assembly is also used in convenience power applications to bring single circuit power to power receptacles and the like.

Figure 16:
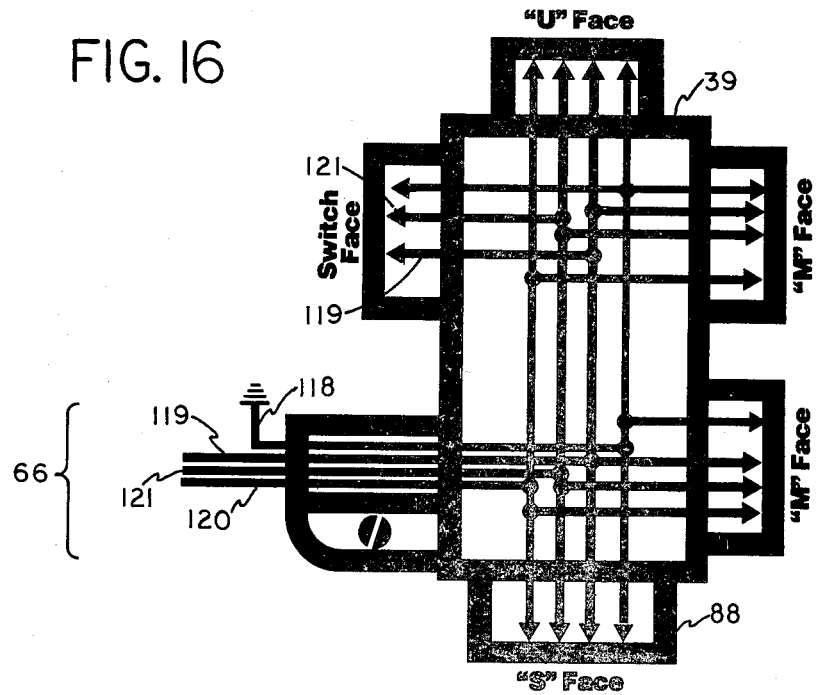
FIG. 16 is an electrical schematic, mechanical diagrammatic view of a type B five-face connector assembly.

A schematic representation of a type "B" five-face connector assembly is shown in FIG. 16. It is seen that the difference between this five-face connector assembly and the type "A" five-face connector assembly is that the switch conductor 121 does pass into the five-face connector 39 from the conductors 66 within the armored cable 68. Therefore, when the connector 69 (see FIG. 4) of the five-face connector assembly is plugged into an "M" face of a type "A" or type "B" connector assembly, switched power is electrically passed through both connector assemblies. This allows one switch assembly 40 and switch 41 to be utilized to control a number of lighting fixtures such as those shown in office 44 in FIG. 1. As shown there, a single switch and switch assembly controls all six lighting fixtures within the room since all six lighting fixtures are connected together by type "B" five-face connector assemblies. This switched power is not passed on to lighting fixtures of an adjacent room since the interconnection to an adjacent room is performed by a type "A" connector assembly. Similarly, this switched power is not brought back to the ceiling distribution panel since the ceiling distribution panel power is brought to the first fixture within room 44 by a type "A" five-face connector assembly. Thus, the type "B" five-face connector assembly is an important component of the modular wiring system for it is normally utilized wherever more than one lighting fixture is to be energized by a single switch.

It is also used in convenience power applications to bring two-circuit power to the receptacles, power poles, and the like.

Figure 20:
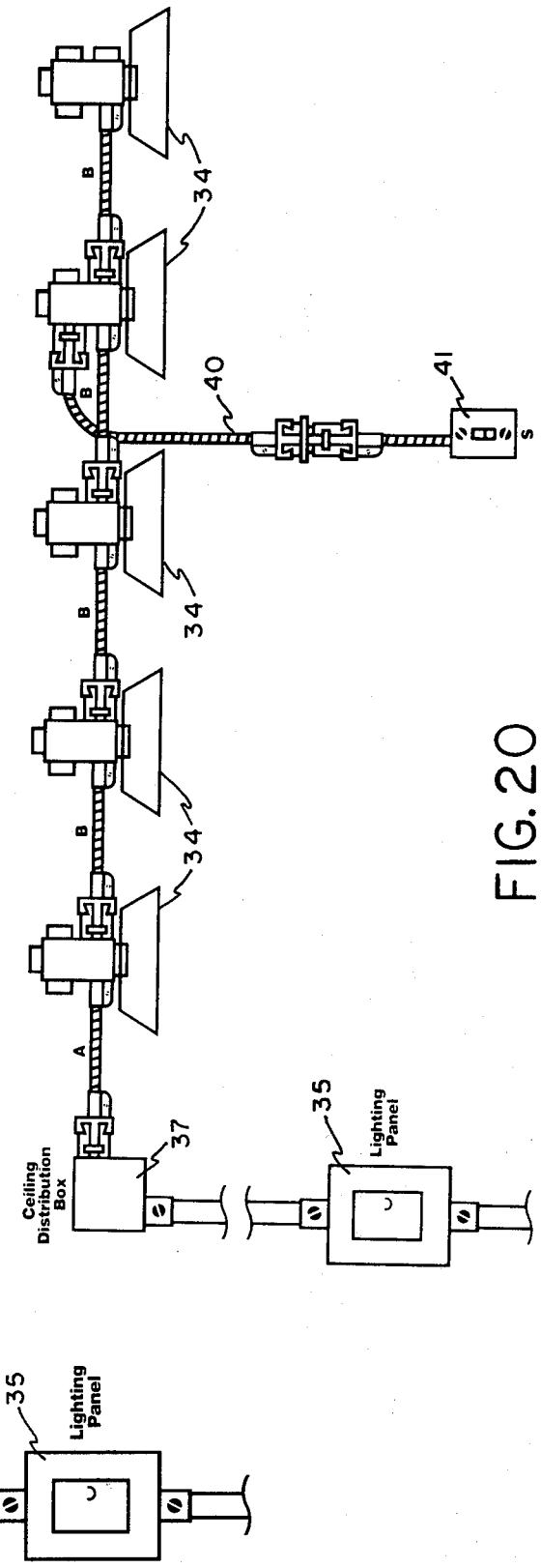
FIG. 20 is a diagrammatic view of single local switching of a circuit comprising multiple lighting fixtures.

A diagrammatic representation of single local switching of a single lighting circuit is shown in FIG. 20. As shown there, a switch cable is connected to a switch assembly 41. FIG. 5A shows the switch cable 40 and switch assembly 41 in greater detail. Thus, connecting conductor 121 to conductor 119 via switch assembly 41 causes power to pass through switch conductor 121 to each "S" face connector 88 on each of the five-face connectors attached to the five fluorescent fixtures.

Figure 21:
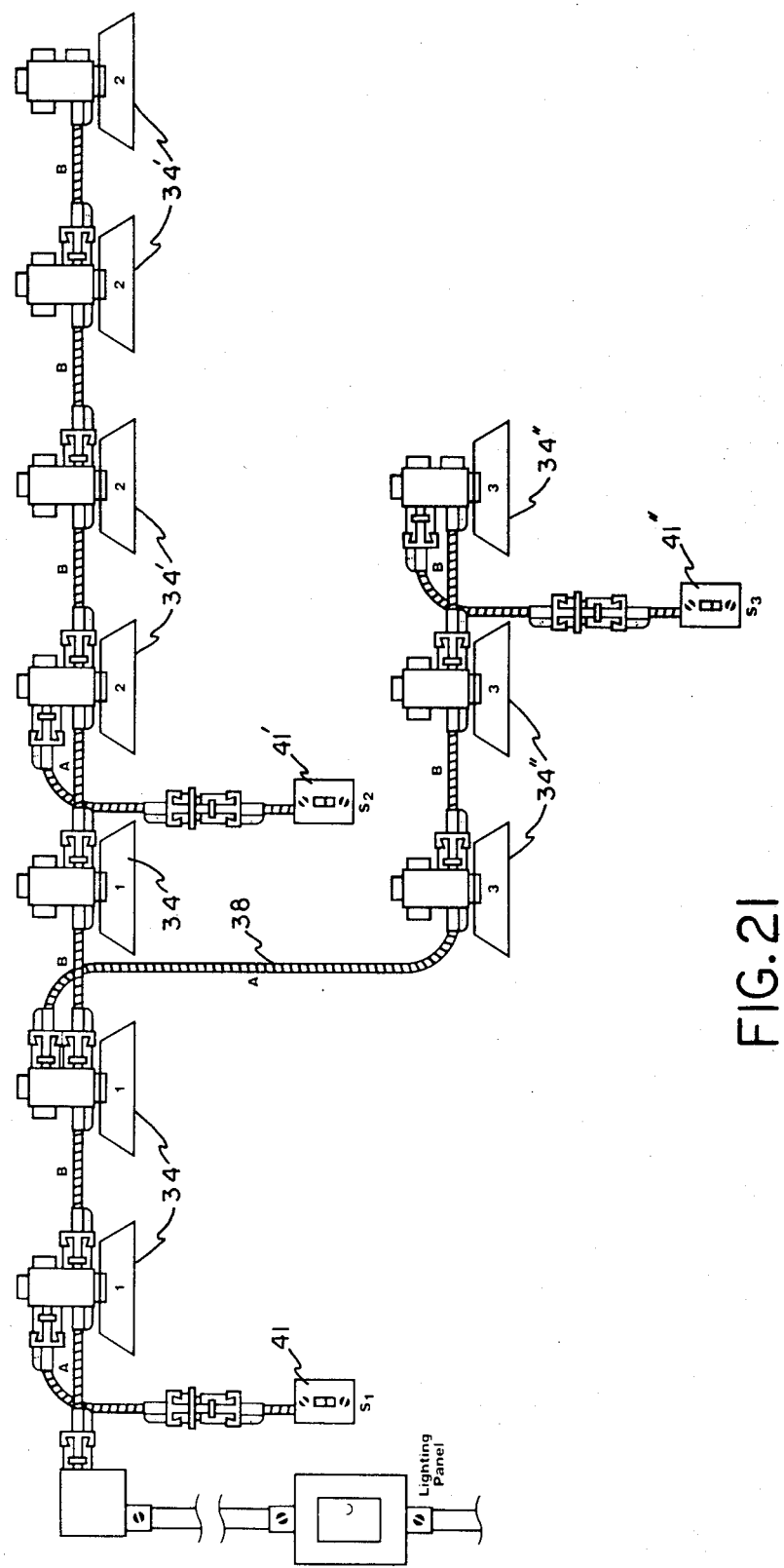
FIG. 21 is a diagrammatic view of multiple local switching of a single circuit powering multiple lighting fixtures.

FIG. 21 illustrates a multiple local switching of a single lighting circuit by use of switch assemblies 41, 41', and 41" to control the lighting of fluorescent fixtures 34, 34' and 34" respectively. As is noted in FIG. 21, each group of fixtures that are switched by a given switch assembly are connected to each other by type "B" connector assemblies while the interconnecting of the groups of lighting fixtures is accomplished by type "A" connector assemblies.

Figure 22:
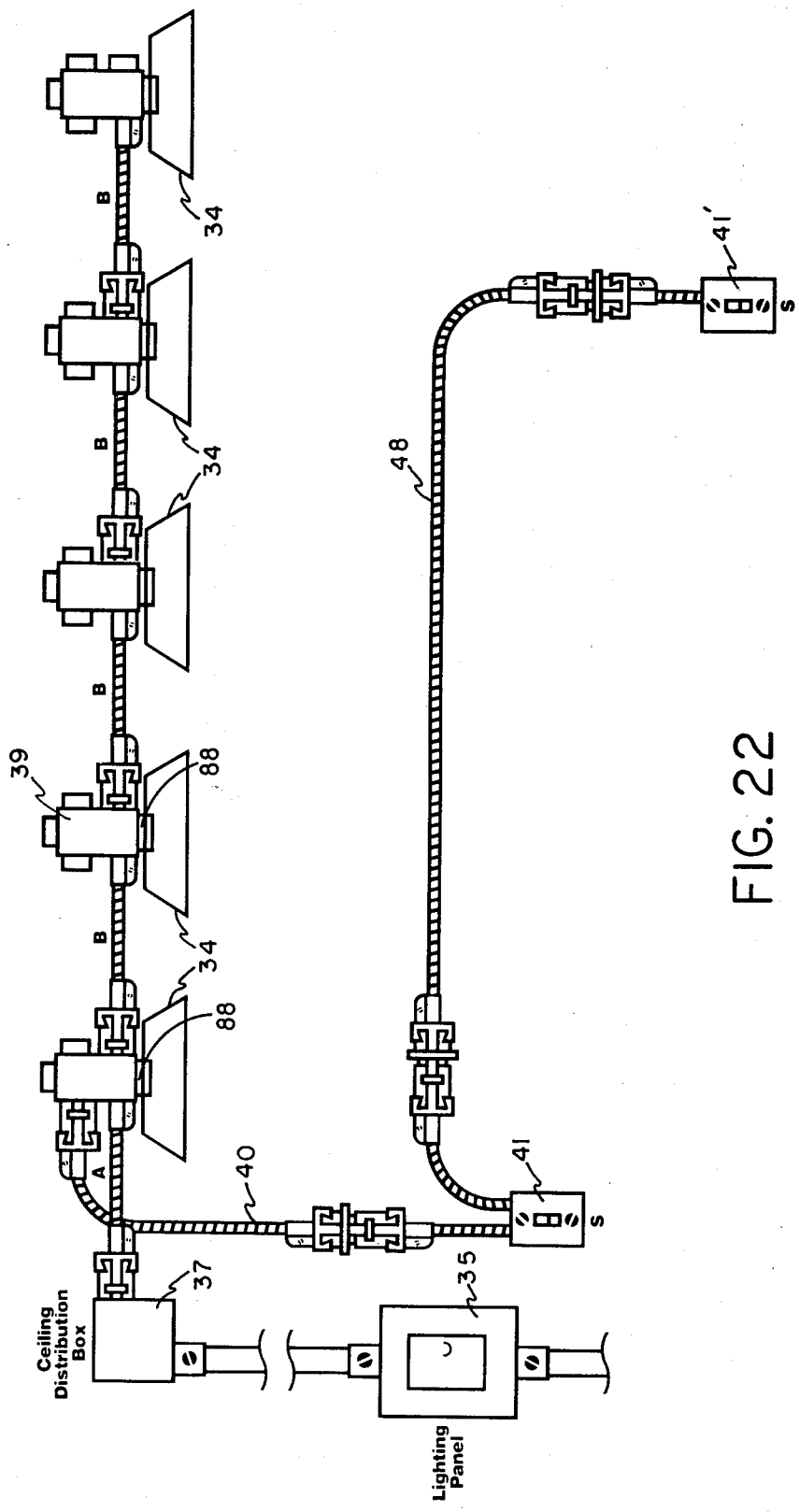
FIG. 22 is a diagrammatic view of three-way local switching of a circuit having multiple lighting fixtures.

FIG. 22 illustrates a three-way local switching of a lighting circuit by means of switch assemblies 41 and 41' which are connected together by cable 48 to allow either switch to control the lighting of fixtures 34. Again, type "B" connector assemblies are connected between the lighting fixtures with connection to the lighting fixtures by the "S" face 88 for each five-face connector 38.

Figure 17:
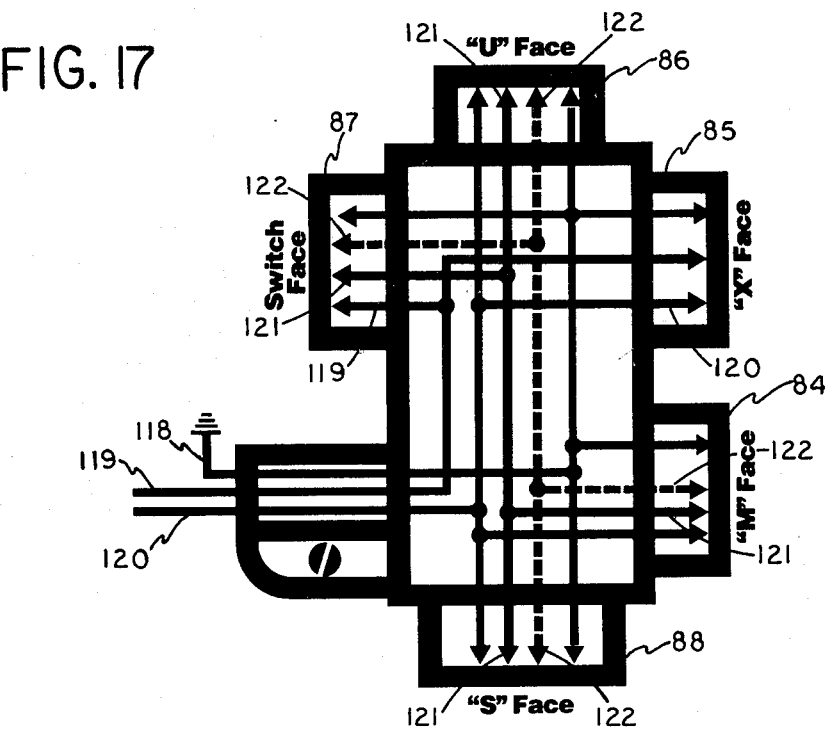
FIG. 17 is an electrical schematic, mechanically diagrammatic view of the type C five-face connector assembly.

FIG. 17 illustrates the schematic representation of a type "C" connector assembly. This connector assembly provides dual switching by allowing hot or power lead 119 to be connected to the first switch lead 121 or to the second switch lead 122 by switch face 87. Thus, either or both of the switch conductors 121 and 122 can be energized by power from conductor 119. The switch conductor 122 is brought out on the "M" face connector 84 but is not brought out on the connector 85, which for the type "C" connector assembly is designated as the "X" face connector. Switch conductor 121, though brought out on both "M" faces 84 and 85, is only used on "M" face 84. Thus, the output power from connector 85 is unswitched while the output power from connector 84 can be switched by either switch conductor 121 or switch conductor 122.

The switch assembly 41 used with the type C connector assembly has two switches, one for control of each switch lead 121 and 122.

Thus, the type "C" five-face connector assembly allows dual switching at both the "S" face connector 88 and the "U" face connector 86. The purpose of the "U" face connector for the type "C" connector assembly is different from its unswitched purpose for the types "A" and "B" connector assemblies. Due to the mechanical alignment of the terminals within the "U" face and "S" face connectors 86 and 88, the switch conductor 121 is connected to a first terminal 93 within receptacle connector 100 (see FIG. 6) for the "S" face connector 88 but for a different terminal 93" when connected to the "U" face connector 86. This provides for alternate switching of fixtures by connecting the alternate fixtures to the "S" and "U" face connectors of the two connector assemblies. A better understanding of this concept is found in FIG. 23. As shown in this figure, switch assembly 41 controls the interconnection of hot lead 119 to switch conductor 121 while switch assembly 41' controls connection of hot lead 119 to switch conductor 122. The roles of switch 41 and 41' of course may be reversed with respect to which conductor they control. In the arrangement shown, fixtures 34 will be energized by switch assembly 41 while fixtures 34' will be energized under the control of switch assemblies 41'. It should be noted that the type "C" connector assembly is only used at the beginning of a switched group of fixtures, and that type "B" connector assemblies are connected to it for passing the switched power from the "M" face connector 84. After the first type "B" connector assembly, the adjoining type "B" connector assemblies can connect to either "M" face connector 84 or 85, although FIG. 23 only shows them connected to connector 84.

In addition, the type "C" connector assembly can be utilized to control the individual lighting of dual ballast lighting fixtures. Thus, if the lighting fixtures shown in FIG. 23 were of the dual ballast type, switch assembly 41 would control the lighting of the fluorescent lamps connected to one ballast in each of the lighting fixtures while switch assembly 41' would control the lighting of fluorescent lamps connected to the alternate ballast in each of the lighting fixtures. Referring to FIG. 17, it is seen that this is accomplished by both switched conductors 121 and 122 being brought out to both the "S" face connector 88 and the "U" face connector 86.

Figure 23:
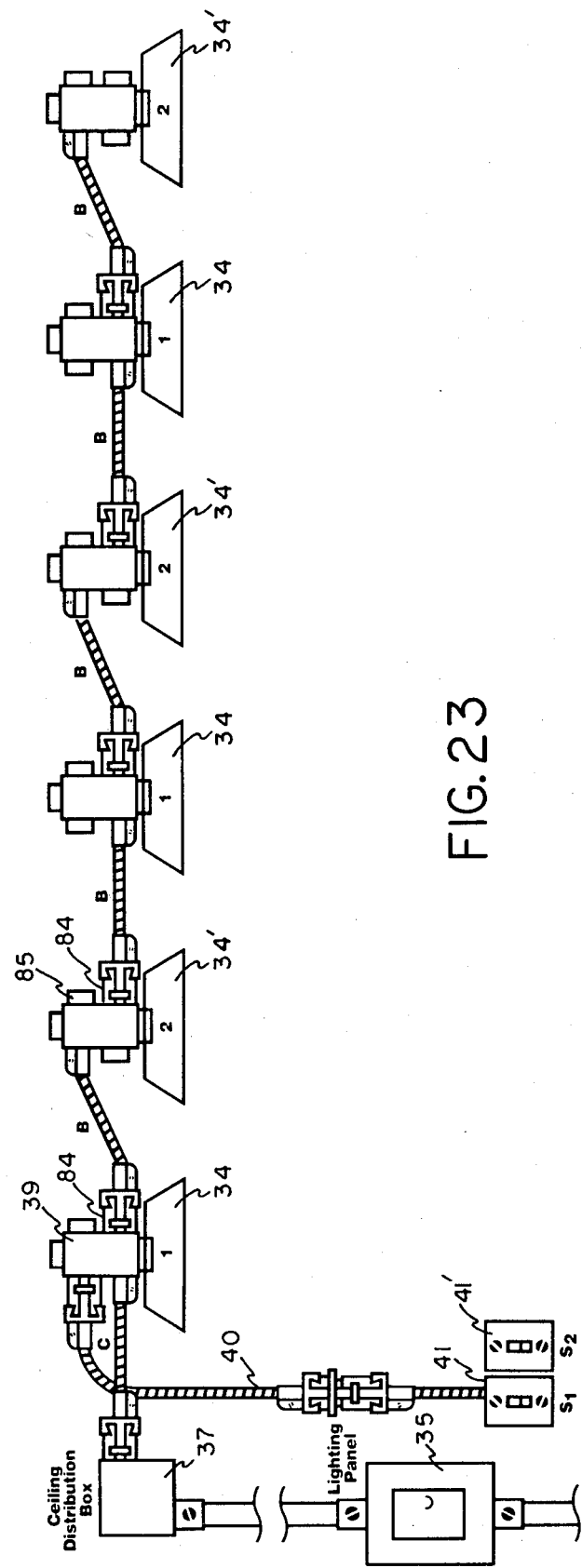
FIG. 23 is a diagrammatic view of dual-switching of alternate fixtures or individual ballasts in dual-ballast fluorescent fixtures of a multiple fluorescent fixture lighting arrangement.

In a dual ballast lighting fixture arrangement, it would not be necessary to connect alternate lighting fixtures to the "S" and "U" face connectors of the five-face connector assemblies as shown in FIG. 23. Indeed, it may for purposes of aesthetics be better to connect all of the lighting fixtures to either the "S" or the "U" face connector of each connector assembly in order that the lamps lit by the first ballast within each fixture will be in the same order.

Figure 18:
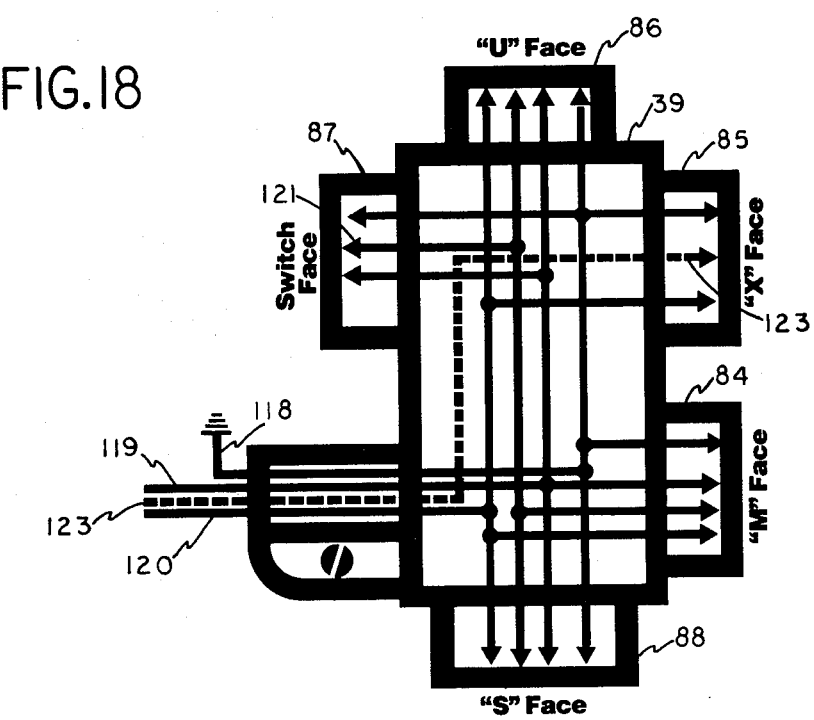
FIG. 18 is an electrical schematic, mechanical diagrammatic view of the type D five-face connector assembly.

Finally, FIG. 18 illustrates the electrical configuration of a type "D" five-face connector assembly. This connector assembly is for the introduction of a switching function for a first circuit by the "M" face connector 84 carrying both switched and unswitched power of the first circuit 119 while the "X" face connector 85 distributes a second circuit 123 to an interconnecting connector assembly. In this type connector assembly, conductor 123 coming into the five-face connector 39 provides the second circuit which is passed directly to the "X" face connector. The first circuit coming into the five-face connector along conductor 119 is passed onto the other remaining connectors with switching of this conductor onto switch conductor 121 by means of the switch face 87. This switched conductor is brought out to the "M" face connector 84 as well as the "S" face and "U" face connectors 88 and 86 respectively.

Figure 24:
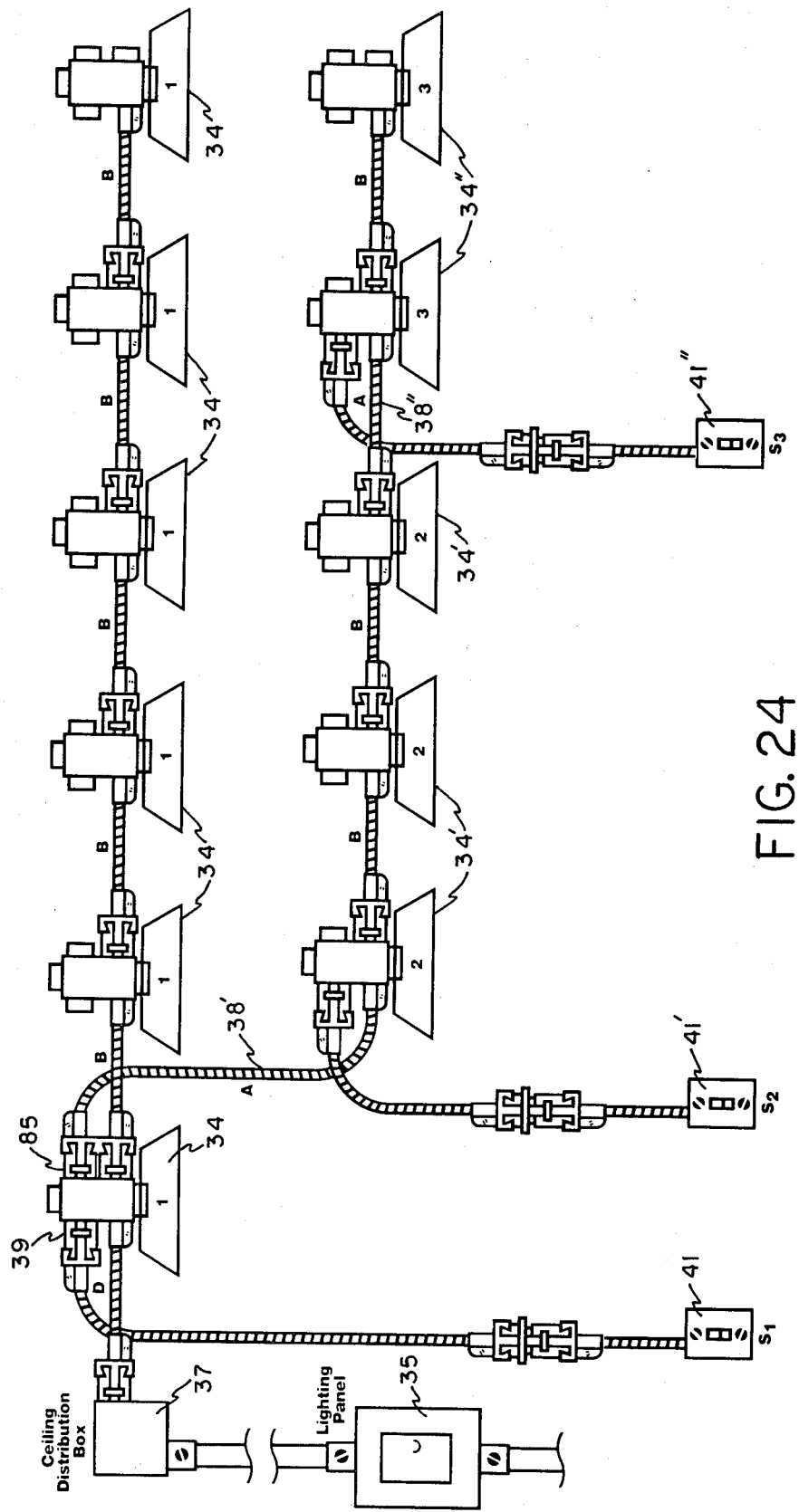
FIG. 24 is a diagrammatic view of a two-circuit application for powering multiple lighting fixtures from two separate electrical circuit sources of power.
Figure 29:
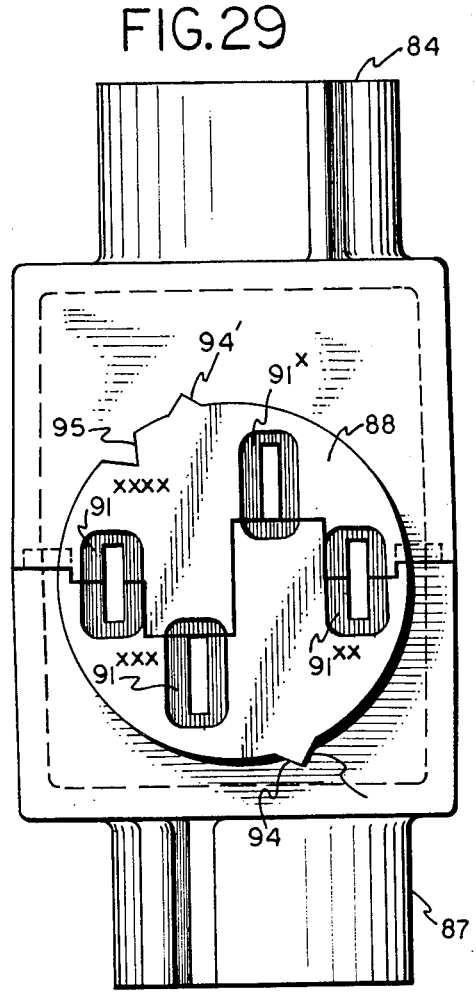
FIG. 29 is a bottom plan view of the housing of the five-face connector showing the "S" face and illustrating the keying arrangement and recess locations for receipt of the bus bar male prongs within the five-face connector.
Figure 38:
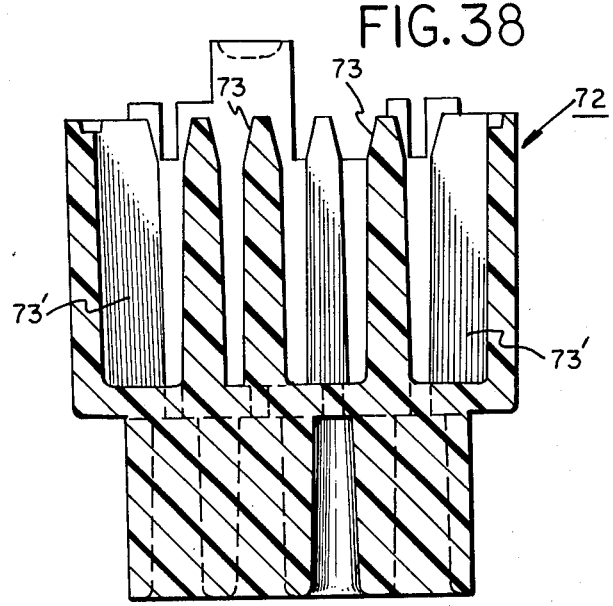
FIG. 38 is a cross-sectional view of the other molded half of the housing shown in FIGS. 11, 12 and 13 taken along line 38—38 of FIG. 11 showing the partitions formed therein for aligning and spacing apart the bus bars.

An example of a lighting arrangement utilizing a type "D" connector assembly is shown in FIG. 24 where it is interconnected between ceiling distribution box 37 and the first lighting fixture 34. The remaining lighting fixtures along the top line of FIG. 24 (having the numeral 1 placed within them) are all switchably powered by the first circuit coming to the first lighting fixture from the type "D" connector assembly with switching performed by switch assembly 41. The lighting fixtures along the second line of FIG. 24 numbered 34' and 34" are all powered by the second circuit within the type "D" connector assembly which is passed on to these lighting circuits by connection of a type "A" connector assembly 38' to the "X" face connector 85 of the type "D" five-face connector 39. Different switching for fixtures 34' and 34" is accomplished by switch assemblies 41' and 41" in conjunction with a type "A" connector assembly 38" between these adjacent fixtures. Again, type "B" connector assemblies are connected between adjacent lighting fixtures which are to be controlled by the same switch.

Figure 36:
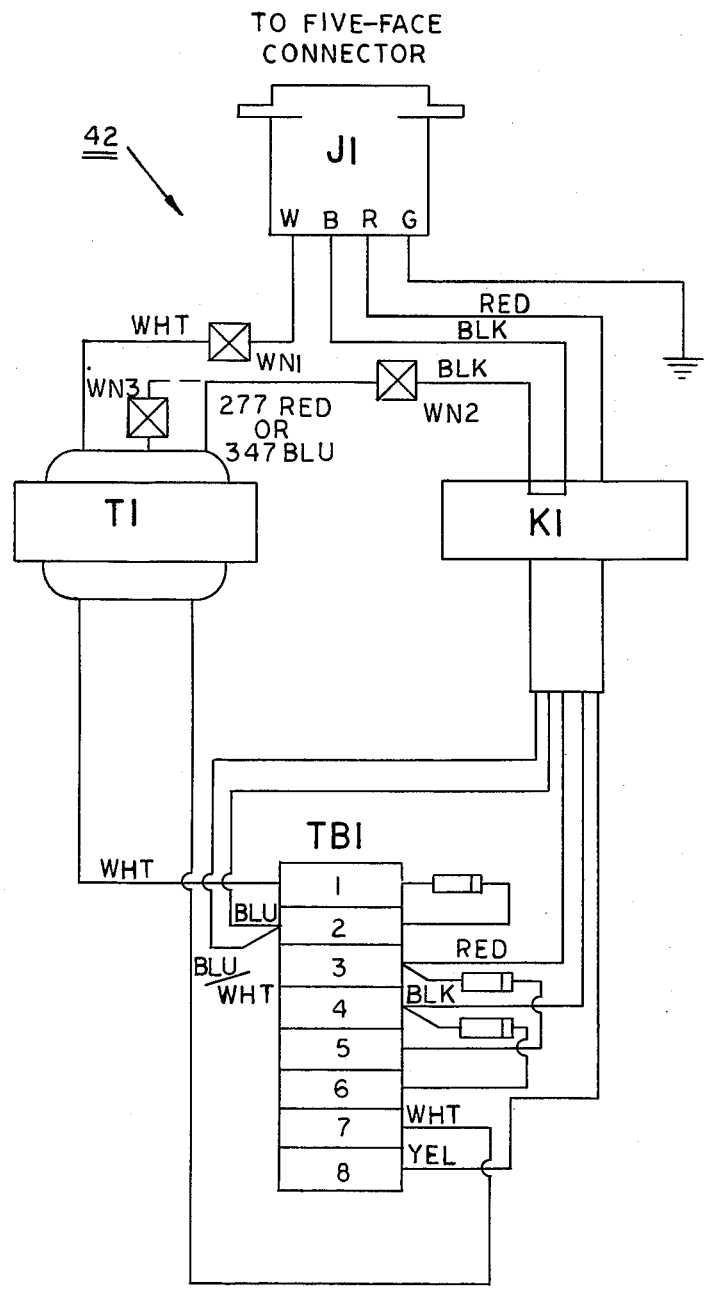
FIG. 36 is a schematic diagram of a typical LVM module.

FIGS. 25, 26, 27 and 28 illustrate additional lighting circuit configurations that may be achieved by the modular wiring system. FIG. 25 is an example of local switched, single circuit lighting. It shows three lines of fixtures 141, 142, and 143 powered from ceiling distribution box 37. Fixture lines 142 and 143 are each controlled by low voltage modules 42. A schematic of a typical LVM is shown in FIG. 36. The fixtures in line 142 are controlled by switch SE (not shown) while those in line 143 are controlled by switches SF and SG (not shown). The switches in line 141 are switched by switch SA (not shown) except for fixture 34'. This fixture powers fixture 34" which receives power from a type C connector assembly 38' and is dual-switched by switches SB and SC (not shown). Fixtures 34''' and 34'''' are respectively controlled by switches SB and SC. Fixture 34*, receiving power from the "X" face of the type C assembly is individually switched by switch SD (not shown).

FIG. 26 is an example of local switched two circuit lighting having two circuits (2, 4) from the CDB 37 to the first fixture 34.

Fixtures 34 and 34' and any downstream from fixture 34' are associated with one circuit and can be controlled by switch SA (not shown). Fixture 34" and any downstream from it are associated with the second circuit and can be controlled by switch SB (not shown).

FIG. 27 illustrates a special two circuit lighting system using multiple LVM's 42. Each LVM controls the switching of two circuits to its string of fixtures 144 or 145. The fixtures can have dual ballast since each string is dual circuited. Switches SA and SB (not shown) control fixtures 34 while switches SC and SD (not shown) control fixtures 34'. In this example, all the fixtures or lamp ballasts controlled by switches SA and SC are on one circuit while the other circuit is controlled by switches SB and SD.

Finally, FIG. 28 illustrates a two circuit (4, 6) unswitched lighting system. The fixtures may have dual ballasts. Type B connector assemblies 38 are used except that type A connector assemblies may be used to power fixtures 34' since they are single circuited.

Bus Bar Configuration of Type A, B, C, and D Five-Face Connectors

FIGS. 11, 12 and 13 in conjunction with FIGS. 14A–14J illustrate the arrangement of bus bars 126, 127, 128, 129, 130, 131, 132, 133, 134 and 135 to obtain the type A, B, C, and D configurations of the five-face connector assembly. FIGS. 29–32 show in detail the external configuration of the five-face connector 39 and facilitate an understanding of the bus bar arrangements.

In FIG. 11 it is seen that bus bars 126, 132, 131 and 128 are used to achieve a type A and B five-face connector assembly. Bus bar 126 is the common conductor, and connects conductor 120 (see FIG. 15) by crimp region 126' to the "U" face connector 86, the two M-face connectors 84 and 85, and the "S" face connector 88. Visualization of the connection of bus bar 126 to the two M-face connectors 84 and 85 can be better realized by comparison of FIG. 32 with FIG. 11 with male prongs 146 and 146' protruding into terminal recesses 91' and 91" respectively.

Similarly, the ground bus bar 128 connects conductor 118 to each connector of the five-face connector by means of male prongs 148. As shown in FIG. 14C, this bus bar has an inverted U-shaped member 157 with hole 158 for receipt of ground screw 78 (see FIG. 4).

Bus bar 132 connects incoming power lead 119 to connector faces 84–88 by means of male prongs 152. An examination of FIGS. 29 and 30 will indicate that male prongs 152' and 152" emanate from the "S" face connector 88 and "U" face connector 86 at recesses 91x. However, it will be noted that recess 91x with respect to connector 86 is near the single protruding ridge 94 while recess 91x with respect to connector 88 is near protruding ridge 94' and groove 95. This allows keying interconnection with a single ballast lighting fixture receptacle so that the power prong mates with a female terminal when the "U"-face connector 86 is used while it connects to a female terminal which is not interconnected with the lighting fixture when the "S" face connector 88 is used (see FIGS. 6 and 6A).

This same relationship is utilized with respect to the switch conductor 121 which is encompassed within the five-face connector by bus bar 131 at crimping region 131'. This bus bar has prongs 152 which are interconnected to each of the connector faces. As seen in FIG. 14F, bus bar 131 comprises two male prongs 151* and 151' which pass through the switchface connector 87. The reason for having two male prongs through this switch-face connector is to insure mechanical mating of four prongs with four female terminals in the connector 69 of switch cable 40 (see FIG. 3). The two prongs are not both needed for electrical purposes. As shown in FIG. 11, bus bar prong 151" connects switched power to "S" face connector 88 while mating with a female lug in the fixture receptacle which is not connected to the lighting fixture when male prong 151''' of connector 86 is utilized. This is the same reversing feature as previously discussed with respect to the power conductor 119. As shown in FIG. 11, the switch conductor 121 is incoming from armored cable 68 (not shown) which is correct with respect to the type B connector which carries the switch power conductor. However this conductor does not exist for the type A connector. Thus, for the type A connector, conductor 121 is not fastened to the bus bar by crimping region 131'.

The electrical circuitry for the type "C" connector assembly shown in FIG. 17 is accomplished by the bus-bar arrangement illustrated in FIG. 12 utilizing a bus-bar 126 for the common or neutral conductor connected to incoming common conductor 120, bus bar 128 for connection to ground conductor 118, bus bar 135 for connection to hot or power conductor 119, bus bar 133 representing the first switched conductor 121 and bus bar 134 representing the second switched conductor 122 (see FIG. 17). Upon examination of FIGS. 17 and 12, both the "S" face connector 88 and the "U" face connector 86 receive the switched and unswitched bus bars 133 and 134 but in a reverse configuration. That is, the female terminal within the fixture receptacle receiving male prong 153' when connected to the "U" face connector 86 will receive the second switched bus bar male prong 154" of bus bar 134 when connected to the "S" face connector 88; and vice-versa with respect to male prong 154' at connector 86 and prong 153" at connector 88. This allows for the powering of alternate fixtures in the arrangement shown in FIG. 23 by merely connecting adjacent fixtures to the "S" and "U" face connectors respectively.

In addition, since both the "S" and "U" face connectors have both switched bus bars terminating in them, they may each be utilized for individually controlling dual ballast fluorescent fixtures.

Furthermore, an examination of FIG. 12 in conjunction with FIG. 17 and bus bar FIGS. 14A, 14C, 14H, 14I and 14J show that the switched face connector 87 has male prongs terminating in it from bus bars 133 and 134 as well as ground bus bar 126 and power bus bar 119. Likewise, the "M" face connector receives male prongs 146*, 153*, 154* and 148* from bus bar 126, 133, 134 and 128 while the "X" face connector 85 receives male prongs 146, 153, 155, and 148 from bus bar 126, 133, 135 and 128. Thus, the "M" face connector receives both switched bus bars controlled by switch face 87 while the "X" face connector passes unswitched power from bus bar 135 and is able to pass switched power from bus bar 133. In actual use this switched power passage is not used since a type A connector assembly normally mates with the "X" face.

Finally, FIG. 13 illustrates the bus bar arrangements for achieving the type "D" five face connector assembly having the electrical circuitry shown in FIG. 18. FIGS. 13, 14A, 14B, 14D, 14E and 14C show how bus bars 126, 127, 129, 130 and 128 are configured to obtain the two circuit electrical configurations shown in FIG. 18. As discussed previously with respect to the type "A," "B" and "C" connector assemblies the common bus bar 126 connects incoming conductor 120 to each of the remaining connectors of the five face connector except the switch face connector 87 while the ground bus bar 128 connects incoming conductor 118 to each of the connectors. Bus bar 129 connects the first power conductor 119 to the switch face, "M" face, "U" face and "S" face connectors 87, 84, 86 and 88 respectively while bus bar 130 connects the second power conductor 122 only to the "X" face connector 85 by means of male prongs 150' and 150". The reason two male prongs are used is to insure that the four recesses 91 within the "X" face connector 85 have a male prong within them for purposes of mechanical stability and for further assurance that an improper interconnection to this connector will not be made.

As also shown in FIGS. 13 and 18, switched power from switch face connector 87 is passed by bus bar 127 only to the "U" face connector 86, "M" face connector 84 and "S" face connector 88; with the same crossover with respect to the "U" face and "S" face connectors as previously discussed with respect to the "A," "B," and "C" connector assemblies. Thus, the "M" face connector 84 passes both switched and unswitched power for the first incoming power conductor 119 while the "X" face conductor only passes unswitched power from the incoming second power conductor 122.

Figure 37:
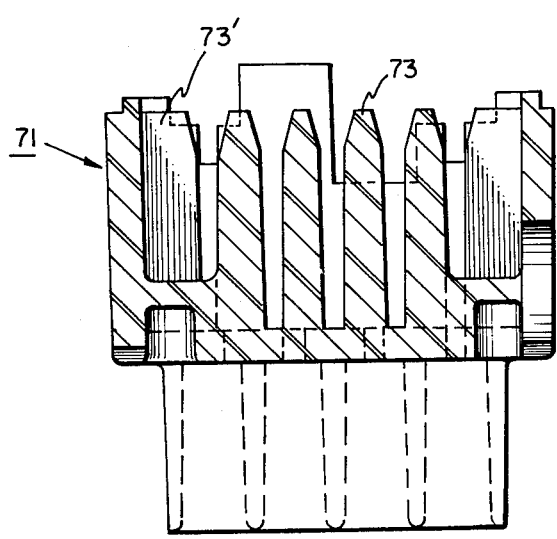
FIG. 37 is a cross-sectional view of one of the molded halves of the housing taken along line 37—37 of FIG. 4, and showing the partitions formed therein for aligning and spacing apart the bus bars.
Figure 30:
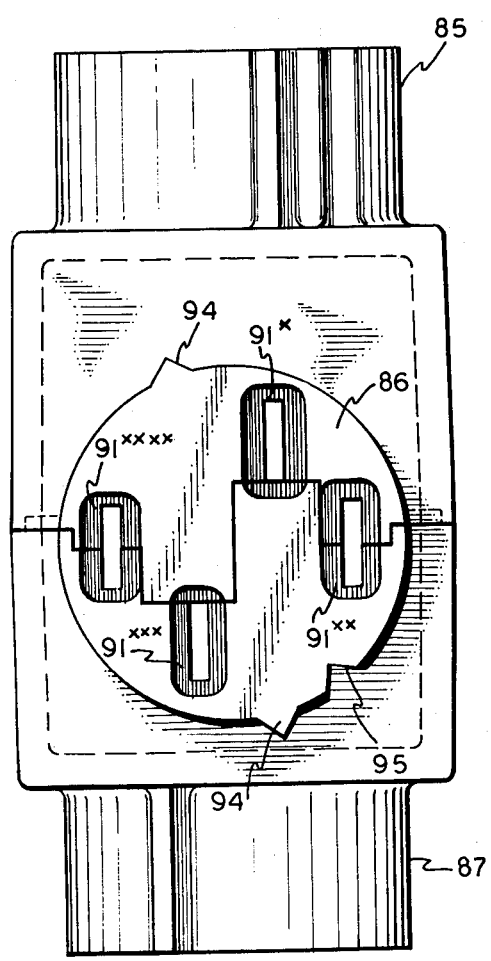
FIG. 30 is a top plan view of the housing of the five-face connector illustrating the "U" face connector with its keying arrangement and terminal recess locations.

Further, it should be noted that FIGS. 11, 12, 13 and 38 show that housing molded half 72 incorporates a number of partitions 73 for aligning and spacing apart bus bars 126–135 used to achieve a particular type of five-face connector assembly. Some of these partitions 73' are transverse to the longer length of the molded half. The same type of partitions are formed in housing molded half 71 as shown in FIG. 37.

Terminal Description and Crimping Process

Figure 34:
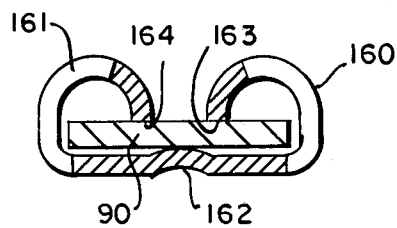
FIG. 34 is a sectional view taken along line 34—34 of FIG. 33 of the female barrel terminal showing a male tab inserted.
Figure 33:
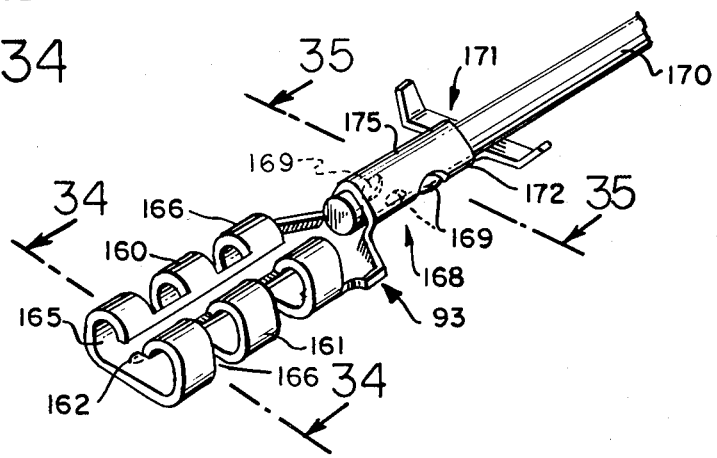
FIG. 33 is a perspective view of the female barrel terminal used in the female connectors of the modulator wiring system illustrating the cutout regions of the barrel spring for resiliently engaging with male tabs on the bus bar and male connectors.

As best seen in FIGS. 33 and 34, the female barrel type terminals 93 incorporate two elongated springs 160 and 161 formed together at bottom flat region which in conjunction with raised dimple 162 maintain mechanical and electrical contact between the downward faces 163 and 164 of springs 160 and 161 respectively against the male prong 90 of the bus bars 126–135 or any other male prong from an individual male terminal. To insure a consistent mechanical electrical connection between the barrel spring terminal and the male prong, cut-outs 166 are made in the elongated springs 160 and 161 to reduce their spring stress and thereby allow them to flex upwardly a greater amount upon insertion of the male prong before permanent set is encountered. By making these cut-outs, the elongated springs are therefore able to withstand repeated interconnections with the male prongs without substantially degrading the mechanical and electrical connection between the two parts.

For the female terminal shown in FIGS. 33 and 34, the cut-outs have a typical length of 0.12 inches while the dimple 162 is at a distance of 0.16 inches from the termination of the springs, with the overall length of the springs being 0.62 inches. The insertion force for a 0.04 inch thickness polished steel prong into the female barrel terminal is between 2.5 and 4.5 pounds. This is able to meet Underwriter Laboratories and CSA standards for 20 amps at up to 347 volts with a 30° C. maximum temperature rise. Both the terminal 53 and the male prong 90 can be plated with a soft metal such as a tin composition to allow a better electrical connection.

Figure 35:
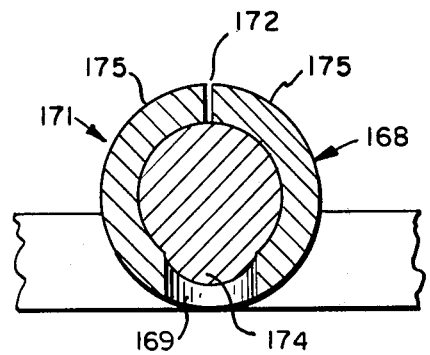
FIG. 35 is a sectional view of the female barrel terminal taken along line 35—35 of FIG. 33 showing the crimping technique with solid wire.

FIGS. 33 and 35 as well as FIGS. 14A–14J illustrate the crimping technique to solid copper wire conductor 170 which can be accomplished in the modular wiring system. This crimping technique can be used for electrical connections. Specifically, FIGS. 33 and 35 show the crimped end 168 of the female terminal 93. This end comprises a cylinder 171 split along line 172. The cylinder includes three diagonally spaced holes 169 preferably having a diameter of 0.07 inches with the burr, if any, facing radially inwardly so as to contact the conductor 170 to be crimped. The holes 169 allow the two cylinder portions 175 of cylinder 171 to be securely forced around a solid conductor 170 by providing space for the conductor to flow when subjected to the high forces encountered in the crimping operation. This flowing of the conductor into the hole is best seen in FIG. 35 at region 174. These regions of flowed copper material anchor the solid wire to cylinder 171 and thus to the terminal. In the preferred embodiment of the present invention, the solid conductor is No. 12 gauge solid copper wire with provisions for utilizing No. 10 gauge solid copper wire. The partially closed barrel formed by cylinder 171 has an inside diameter of 0.11 inches and a length of 0.31 inches. This arrangement thereby provides a secure mechanical and electrical interconnection between the solid conductor and the female barrel type terminal and is able to withstand twisting of the conductor with respect to the terminal without the conductor becoming mechanically or electrically loosened.

As seen in FIGS. 14A–14J, a number of the bus bars 126, 128, 129, 130, 131, 132 and 135 are designed for receiving a solid conductor at crimping region or lug portion 126', 128', 129', 130', 131', 132' and 135'. The crimping regions are shown in their open position in FIGS. 14A–14J. These crimped regions are also seen in FIGS. 11, 12 and 13 in their closed configuration after being crimped about a conductor. The same crimping technique is used with these bus bars as for female terminals 93. Thus, each crimped region such as 126' has three holes 173 designed for allowing the solid copper conductor to flow therein after it is crimped about this crimping region.

This technique therefore allows the five-face connector assembly as well as the cables used in conjunction with the five-face connector assembly to incorporate solid conductor wire which is normally found in BX cable. Such BX cable is less expensive than stranded wire conductor cable and therefore the end cost for this modular wiring system is less expensive than other modular wiring systems which use stranded wire conductor.

SUMMARY

Thus what has been described is a modular wiring system for providing electrical power to lighting fixtures and power receptacles used in buildings with accessible ceiling plenums. The modular wiring system comprises four different types of five-face connector assemblies with cable sets designed for interconnecting to the power out faces of the five-face connector and switching cable connectors designed for mating with the switch face connector of the five-face connector assembly. Switched and unswitched power is provided on different connectors of the five-face connector assembly for mating with lighting fixture receptacles. In power distribution applications, the five-face connector assembly is adapted for mating with receptacle outlet cables, power poles and poke-through wiring devices in a manner analagous to the connection with lighting fixtures. Keying arrangements on the five-face connector and other components of the system prevent incorrect mating of parts. All mating parts of the system provide a mechanical latching which minimizes mechanical stresses to the components while the flush mounted lighting fixture receptacle is able to rotate 180° in order to prevent torsional stresses on the fixture receptacle when mated with the five-face connector.

The five-face connector utilizes two molded halves having recesses for accepting specially designed bus bars which provide the means for achieving the four different types of five-face connector assembly functions. These bus bars also eliminate the need for individual terminals on the five-face connector.

A special crimping technique is used for securing solid conductor wire to the bus bars and terminals. The female terminals are also specially designed to allow multiple interconnections with male prongs.

The resultant modular wiring system is thus a unique departure from the previous wiring modular systems and their need for interconnecting adapters and the like.

It will thus be seen that the objects set forth above, among those made apparent from the preceding description, are efficiently attained and, since certain changes may be made in the above circuitry without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A connector assembly for a modular wiring system comprising:
   (A) a first connector having plural terminals of a first configuration for receipt of electrical power from a source of electrical power or from another connector assembly;
   (B) a series of conductors, each individually permanently terminating at one end with one of the first connector terminals; and
   (C) a multi-face connector (39) having at least second, third, fourth, fifth, and sixth connectors, each connector having a separate face with a plurality of recesses formed in each face, each recess of each face substantially coplanar with a recess of each other face, and further wherein:
      (1) the second connector ("S" face 88) has plural terminals of a second configuration unable to mate with the source of electrical power for mating with a lighting fixture receptacle so as to provide at least switched power to the fixture,
      (2) the third connector ("U" face 86) has plural terminals of a second configuration unable to mate with the source of electrical power for mating with a lighting fixture receptacle so as to provide at least unswitched power to the fixture,
      (3) the fourth connector ("switch" face 87) has plural terminals of a second configuration unable to mate with the source of electrical power for mating with a switch or switch assembly for controlling the switched power,
      (4) the fifth connector ("M" face 84) has plural terminals of a second configuration unable to mate with the source of electrical power for mating with the first connector of a second connector assembly for passing power to the second connector assembly,
      (5) the sixth connector ("M" or "X" face 85) has plural terminals of a second configuration unable to mate with the source of electrical power for mating with the first connector of a third connector assembly for passing power to the third connector assembly,
      (6) a plurality of bus bars, at least some of the bus bars having a region for permanent connection to one of the conductors, each bus bar forming some of the terminals of the second, third, fourth, fifth and sixth connectors, at least some of the bus bars interlaced in an electrically isolated, non-coplanar arrangement with each other, each of the interlaced bus bars having at least some of its terminals in a non-coplanar arrangement with each other so that the electrical property on the bus bar is presented at different planar recesses for at least some of the second, third, fourth, fifth, and sixth connector faces, and
      (7) a housing for forming the second, third, fourth, fifth and sixth connector faces and for placement and orientation of the bus bars therein;
   whereby power is only received by the connector assembly through the first connector which is remotely positioned away from the multi-face connector, wherein the multi-face connector distributes and controls power to receptacles, switch or switch assemblies, and connectors, and wherein the second, third, fourth, fifth, and sixth connectors are unable to mate with the source of electrical power.

2. A connector assembly as defined in claim 1, where the multi-face connector housing has two molded halves (71 and 72) forming the recesses (91) for receipt of the second, third, fourth, fifth and sixth connector plurality of terminals, and further wherein the multi-face connector incorporates an armored jacket mounted to the outside of the housing, the armored jacket (74) having extending fingers (82), and wherein the first connector also has fingers (80) dimensioned for mating with at least some of the multi-face connector fingers (82) so that mechanical stress from mating connectors is passed through the armored jacket (74) of the multi-face connector without being imparted to the molded halves.

3. A connector assembly as defined in claim 2 wherein the armored jacket has extending fingers about each of the connectors of the multi-face connector, and wherein the lighting receptacle and switch or switch assembly has components for mating with the fingers associated with the connector to which the receptacle and switch or switch assembly mate.

4. A connector assembly as defined in claim 1, wherein the power distribution function of the multi-face connector is,
   (1) for the "S" face connector to only provide switched power to the fixture,
   (2) for the "U" face connector to only provide unswitched power to the fixture, and
   (3) for the "M" face connectors (84 and 85) to distribute both unswitched and switched power; and
where three conductors comprise the series of conductors, a first conductor for ground, a second conductor for a single circuit power, and a third conductor for neutral.

5. A connector assembly for a modular wiring system comprising:
   (A) a first connector having plural terminals of a first configuration for receipt of electrical power from a source of electrical power or from another connector assembly;
   (B) at least four conductors, each individually permanently terminating at one end with one of the first conductor terminals, a first conductor for ground, a second conductor for a single circuit power, a third connector for neutral, and a fourth conductor for switched power, and wherein the conductor for switched power may alternatively be used for conducting a second circuit power line; and
   (C) a multi-face connector (39) having at least
      (1) a second connector ("S" face 88) having plural terminals of a second configuration unable to mate with the source of electrical power for mating with a lighting fixture receptacle so as to provide both switched and unswitched power to the fixture if the fixture is a dual ballast fixture and to provide switched power to the fixture if it is a single ballast fixture,
      (2) a third connector ("U" face 86) having plural terminals of a second configuration unable to mate with the source of electrical power for mating with a lighting fixture receptacle so as to provide both switched and unswitched power to the fixture if the fixture is a dual ballast fixture and to provide unswitched power to the fixture if it is a single ballast fixture,
      (3) a fourth connector ("switch" face (87) having plural terminals of a second configuration unable to mate with the source of electrical power for mating with a switch or switch assembly for controlling the switched power,
(4) a fifth connector ("M" face 84) having plural terminals of a second configuration unable to mate with the source of electrical power for mating with the first connector of a second connector assembly so as to distribute both switched and unswitched power to the second connector assembly,
(5) a sixth connector ("M" or "X" face 85) having plural terminals of a second configuration unable to mate with the source of electrical power for mating with the first connector of a third connector assembly so as to distribute both switched and unswitched power to the third connector assembly, and
(6) means for permanently electrically terminating the second end of each conductor of the four conductors and for electrically connecting these conductors to the second, third, fourth, fifth and sixth connector terminals so as to distribute the desired power to each of these connectors;

whereby power is only received by the connector assembly through the first connector which is remotely positioned away from the multi-face connector, wherein the multi-face connector distributes and controls power to receptacles, switch or switch assemblies, and connectors, and wherein the second, third, fourth, fifth, and sixth connectors are unable to mate with the source of electrical power.

6. A connector assembly for a modular wiring system comprising:
(A) a first connector having plural terminals of a first configuration for receipt of electrical power from a source of electrical power or from another connector assembly;
(B) at least three conductors, each individually permanently terminating at one end with one of the first connector terminals, a first conductor for ground, a second conductor for a single circuit power, and a third conductor for neutral; and
(C) a multi-face connector (39) having at least
(1) a second connector ("S" face 88) having plural terminals of a second configuration unable to mate with the source of electrical power for mating with a lighting fixture receptacle so as to provide dual switched power of a single power circuit to an interconnected fixture,
(2) a third connector ("U" face 86) having plural terminals of a second configuration unable to mate with the source of electrical power for mating with a lighting fixture receptacle so as to provide dual switched power of a single power circuit to an interconnected fixture,
(3) a fourth connector ("switch" face 87) having plural terminals of a second configuration unable to mate with the source of electrical power for mating with a switch or switch assembly having two switches for individually controlling the dual switched power,
(4) a fifth connector ("M" face 84) having plural terminals of a second configuration unable to mate with the source of electrical power for mating with the first connector of a second connector assembly so as to distribute both switched power lines without unswitched power,
(5) a sixth connector ("X" face 85) having plural terminals of a second configuration unable to mate with the source of electrical power for mating with the first connector of a third connector assembly so as to distribute unswitched power and no more than one of the two switched power lines, and
(6) means for permanently electrically terminating the second end of each conductor of the three conductors and for electrically connecting these conductors to the second, third, fourth, fifth and sixth connector terminals so as to distribute the desired power to each of these connectors;

whereby power is only received by the connector assembly through the first connector which is remotely positioned away from the multi-face connector, wherein the multi-face connector distributes and controls power to receptacles, switch or switch assemblies, and connectors, and wherein the second, third, fourth, fifth, and sixth connectors are unable to mate with the source of electrical power.

7. The connector assembly for a modular wiring system comprises:
(A) a first connector having plural terminals of a first configuration for receipt of electrical power from a source of electrical power or from another connector assembly;
(B) at least four conductors, each individually permanently terminating at one end with one of the first connector terminals, a first conductor for ground, a second conductor for a first power circuit, a third conductor for a second power circuit, and a fourth conductor for neutral;
(C) a multi-face connector (39) having at least
(1) a second connector ("S" face 88) having plural terminals of a second configuration unable to mate with the source of electrical power for mating with a lighting fixture receptacle so as to provide switched power to a single ballast fixture and, for a dual ballast fixture, switched power to one ballast of a dual ballast fixture and unswitched power to the other ballast of the dual ballast fixture,
(2) a third connector ("U" face 86) having plural terminals of a second configuration unable to mate with the source of electrical power for mating with a lighting fixture receptacle so as to provide only unswitched power to a single ballast fixture and, for a dual ballast fixture, unswitched power to one ballast of the dual ballast fixture and switched power to the other ballast of the fixture,
(3) a fourth connector ("switch" face 87) having plural terminals of a second configuration unable to mate with the source of electrical power for mating with a switch or switch assembly for controlling the switched power,
(4) a fifth connector ("M" face 84) having plural terminals of a second configuration unable to mate with the source of electrical power for mating with the first connector of a second connector assembly so as to distribute both switched and unswitched power of one power circuit, and
(5) a sixth connector ("X" face 85) having plural terminals of a second configuration unable to mate with the source of electrical power for mating with the first connector of a third connector assembly, so as to distribute only the unswitched power to a second power circuit, and (6) means for permanently electrically terminating the second end of each conductor of the four conductors and for electrically connecting these conductors to the second, third, fourth, fifth and sixth connector terminals so as to distribute the desired power to each of these connectors; whereby power is only received by the connector assembly through the first connector which is remotely positioned away from the multi-face connector, wherein the multi-face connector distributes and controls power to receptacles, switch or switch assemblies, and wherein the second, third, fourth, fifth, and sixth connectors are unable to mate with the source of electrical power.

8. A modular wiring system comprising:
(I) a connector assembly for a modular wiring system comprising,
   (A) a first connector having plural terminals of a first configuration for receipt of electrical power from a source of electrical power or from another connector assembly;
   (B) at least three conductors for the passage of dual circuit power, each individually permanently terminating at one end with one of the first connector terminals; and
   (C) a multi-face connector (39) having at least
      (1) a second connector ("S" face 88) having plural terminals of a second configuration unable to mate with the source of electrical power for mating with a lighting fixture receptacle so as to provide at least switched power to the fixture,
      (2) a third connector ("U" face 86) having plural terminals of a second configuration unable to mate with the source of electrical power for mating with a lighting fixture receptacle so as to provide at least unswitched power to the fixture,
      (3) a fourth connector ("switch" face 87) having plural terminals of a second configuration unable to mate with the source of electrical power for mating with a switch or switch assembly for controlling the switched power,
      (4) a fifth connector ("M" face 84) having plural terminals of a second configuration unable to mate with the source of electrical power for mating with the first connector of a second connector assembly for passing power to the second connector assembly,
      (5) a sixth connector ("M" or "X" face 85) having plural terminals of a second configuration unable to mate with the source of electrical power for mating with the first connector of a third connector assembly for passing power to the third connector assembly, and
      (6) means for permanently electrically terminating the second end of each conductor of the series of conductors and for electrically connecting these conductors to the second, third, fourth, fifth and sixth connector terminals so as to distribute the desired power to each of these connectors; and
(II) a dual circuit low voltage module powered from a utility source of dual circuit power for controlling the switching of the dual circuit power to the interconnected multi-face connector assemblies;

whereby the lighting fixtures powered by the multi-face connector assemblies may be individually controlled by switched power of one of the two power circuits and whereby additional lighting fixtures may be controlled by additional low voltage modules also powered from the dual circuit utility power; and further whereby power is only received by the connector assembly through the first connector which is remotely positioned away from the multi-face connector, wherein the multi-face connector distributes and controls power to receptacles, switch or switch assemblies, and connectors, and wherein the second, third, fourth, fifth, and sixth connectors are unable to mate with the source of electrical power.

9. A modular wiring system having a connector assembly as defined in claim 4 and further comprising a low voltage module powered by a single circuit source of utility power and interconnected to the first connector of the connector assembly for providing switchable power to the multi-face connector assembly.

10. A connector assembly as defined in claims 4, 6, 7, 8 or 9, wherein the multi-face connector means for electrically terminating the conductors and distributing power to and forming the second, third, fourth, fifth, and sixth connector terminals comprises a series of bus bars, each having terminals at some of their ends for insertion into at least some of the second, third, fourth, fifth, and sixth connectors and at least some of the bus bars having a region for connection to the second end of one of the conductors.

11. A connector assembly as defined in claim 10, wherein each bus bar has a region for connection to the second end of one of the conductors which comprises an elongated split cylinder having two or more holes passing through the cylinder to allow the conductor when formed from a solid material to flow within a portion of the holes when the split cylinder is squeezed closed during the crimping operation so as to secure the conductor to the bus bar and provide a mechanical and electrical connection which is not adversely affected by twisting of the conductor with respect to the bus bar.

12. A connector assembly for a modular wiring system comprising:
(A) a first connector having plural terminals of a first configuration for receipt of electrical power from a source of electrical power or from another connector assembly;
(B) a series of conductors, each individually permanently terminating at one end with one of the first connector terminals; and
(C) a multi-face connector (39) having at least second, third and fourth connectors, each connector having a separate face with a plurality of recesses formed in each face, each recess of each face substantially coplanar with a recess of each other face, and further wherein:
   (1) the second connector ("S" face 88) has plural terminals of a second configuration unable to mate with the source of electrical power for mating with a lighting fixture receptacle so as to provide at least switched power to the fixture,
   (2) the third connector ("switch" face 87) has plural terminals of a second configuration unable to mate with the source of electrical power for mating with a switch or switch assembly for controlling the switched power,
   (3) the fourth connector ("M" face 84) has plural terminals of a second configuration unable to mate with a source of electrical power for mating with the first connector of a second connector assembly for passing power to the second connector assembly (4) a plurality of bus bars, at least some of the bus bars having a region for permanent connection to one of the conductors, each bus bar forming some of the terminals of the second, third, and fourth connectors, at least some of the bus bars interlaced in an electrically isolated, non-coplanar arrangement with each other, each of the interlaced bus bars having at least some of its terminals in a non-coplanar arrangement with each other so that the electrical property on the bus bar is presented at different planar recesses for at least some of the second, third, and fourth connectors faces, and (5) a housing for forming the second, third and fourth connector faces and for placement of the bus bars therein;

whereby power is only received by the connector assembly through the first connector which is remotely positioned away from the multi-face connector, wherein the multi-face connector distributes and controls power to receptacles, switch or switch assemblies, and connectors, and wherein the second, third, and fourth connectors are unable to mate with the source of electrical power.

13. A connector assembly as defined in claim 12, wherein the multi-face connector further comprises:

(6) a fifth connector ("M" or "X" face 85) having plural terminals of a second configuration unable to mate with the source of electrical power, for mating with the first connector of a third connector assembly for passing power to the third connector assembly.

14. A connector assembly for a modular wiring system comprising:

(A) a first connector having plural terminals of a first configuration for receipt of electrical power from a source of electrical power or from another connector assembly, (B) a series of conductors, each individually permanently terminating at one end with one of the first connector terminals; and (C) a multi-face connector (39) having at least second, third and fourth connectors, each connector having a separate face with a plurality of recesses formed in each face, each recess of each face substantially coplanar with a recess of each other face, and further wherein:

(1) the second connector ("S" face 88 or "U" face 86) has plural terminals of a second configuration unable to mate with the source of electrical power for mating with a lighting fixture receptacle so as to provide power to the fixture, (2) a third connector ("M" face 84) has plural terminals of a second configuration unable to mate with the source of electrical power for mating with the first connector of a second connector assembly for passing power to the second connector assembly, (3) a fourth connector ("M" or "X" face 85) has plural terminals of a second configuration unable to mate with the source of electrical power for mating with the first connector of a third connector assembly for passing power to the third connector assembly, (4) a plurality of bus bars, at least some of the bus bars having a region for permanent connection to one of the conductors, each bus bar forming some of the terminals of the second, third and fourth connectors, at least some of the bus bars interlaced in an electrically isolated, non-coplanar arrangement with each other, each of the interlaced bus bars having at least some of its terminals in a non-coplanar arrangement with each other so that the electrical property on the bus is presented at different planar recesses for at least some of the second, third and fourth connector faces, and (5) a housing for forming the second, third and fourth connector faces and for placement of the bus bars therein.

15. A connector assembly as defined in claims 12 or 14, wherein each bus bar that has a region for connection to the second end of one of the conductors comprises an elongated split cylinder having two or more holes passing through the cylinder to allow the conductor when formed from a solid material to flow within a portion of the holes when the split cylinder is squeezed closed during a crimping operation around the conductor so as to secure the conductor to the bus bar and provide a mechanical and electrical connection which is not adversely affected by twisting the conductor.

16. A connector assembly as defined in claims 1, 12, or 14, wherein each connector of the multi-face connector has means for preventing that particular connector from mating with any other connector but that to which it is designated to mate.

17. A connector assembly as defined in claim 16, wherein the mating preventing means comprises ridges (94) and notches (95) on the connectors of the multi-face connector.

18. A connector assembly as defined in claim 17, wherein the mating preventing means further provides for mating with the designated connector in a particular orientation.

19. A connector assembly as defined in claim 18, wherein the mating preventing means and orientation means comprises ridges (94) and notches (95) on the connectors of the multi-face connector.

20. A connector assembly as defined in claim 12 or 14, wherein the multi-face connector incorporates an armored jacket (74) mounted to the outside of the housing, the armored jacket having extending fingers (82) about each connector of the multi-face connector, the interconnecting receptacles, switch or switch assembly, and connector having fingers (80) of finger-like projections (106) for mating with the multi-face connector fingers so that mechanical stress from mating connectors is passed through the armored jacket of the multi-face connector without being imparted to the housing.

21. A connector assembly for a modular wiring system for interconnecting wall outlet receptacle assemblies, power poles, and poke through wiring devices, comprising:

(A) a first connector having plural terminals of a first configuration for receipt of at least dual circuit electrical power from a source of electrical power or from another connector assembly;

(B) a series of conductors, each individually permanently terminating at one end with one of the first connector terminals;

(C) a multi-face connector having at least (1) a second connector having plural terminals of a second configuration unable to mate with the source of electrical power for mating with a wall outlet receptacle assembly, power poles, or poke through wiring devices, the terminals of the second connector carrying a first circuit of the dual circuit power for said mating, and the second connector having means for preventing the second connector from mating with anything other than a wall outlet receptacle assembly, a power pole, or a poke through wiring device, (2) a third connector having plural terminals of a second configuration unable to mate with the source of electrical power for mating with a wall outlet receptacle assembly, power pole, or poke through wiring device, the terminals of the third connector carrying a second circuit of the dual circuit power for said mating, and the third connector having means for preventing the third connector from mating with anything other than a wall outlet receptacle assembly, a power pole, or a poke through wiring device, (3) a fourth connector having plural terminals of a second configuration unable to mate with the source of electrical power for mating with the first connector of a second connector assembly for passing at least dual circuit power to the second connector assembly, and the fourth connector having means for preventing the fourth connector from mating with anything other than a first connector, (4) a series of bus bars each having terminating ends for insertion into at least some of the second, third, and fourth connectors and at least some of the bus bars each having a region for permanent connection to the second end of one of the conductors so as to provide electrical terminations of the conductors and distribution of power to the second, third, and fourth connectors, and (5) a housing having recesses formed therein, the housing having a series of partitions for aligning and spacing the bus bars inserted therein, with the bus bar terminating ends positioned in the housing recesses so as to allow the terminating ends to move within the recesses.

22. A connector assembly as defined in claim 21, wherein the mating preventing means comprises ridges and notches on the connectors of the multi-face connector.

23. A connector assembly as defined in claim 22, wherein the multi-face connector further comprises an armored jacket having extending fingers about each connector of the multi-face connector so as to mate with fingers on interconnecting components so that mechanical stress for mating components is passed through the armored jacket of the multi-face connector without being imparted to the housing.

24. A connector assembly for a modular wiring system comprising:
(A) a first connector having plural terminals of a first configuration for receipt of electrical power from a source of electrical power or from another connector assembly;
(B) a series of conductors, each individually permanently terminating at one end with one of the first connector terminals; and
(C) a multi-face connector (39) having at least (1) a second connector ("S" face 88) having plural terminals of a second configuration unable to mate with the source of electrical power for mating with a lighting fixture receptacle so as to provide at least switched power to the fixture, (2) a third connector ("U" face 86) having plural terminals of a second configuration unable to mate with the source of electrical power for mating with a lighting fixture receptacle so as to provide at least unswitched power to the fixture, (3) a fourth connector ("switch" face 87) having plural terminals of a second configuration unable to mate with the source of electrical power for mating with a switch or switch assembly for controlling the switched power, (4) a fifth connector ("M" face 84) having plural terminals of a second configuration unable to mate with the source of electrical power for mating with the first connector of a second connector assembly for passing power to the second connector assembly, (5) a sixth connector ("M" or "X" face 85) having plural terminals of a second configuration unable to mate with the source of electrical power for mating with the first connector of a third connector assembly for passing power to the third connector assembly, and (6) bus bars for permanently electrically terminating the second end of each conductor of the series of conductors and for electrically connecting these conductors to the second, third, fourth, fifth and sixth connector terminals formed by the bus bars so as to distribute the desired power to each of these connectors, each bus bar forming some of the terminals of the second, third, fourth, fifth, and sixth connectors, at least some of the bus bars interlaced in an electrically isolated, non-coplanar arrangement with each other, each of the interlaced bus bars havig at least some of its terminals in a non-coplanar arrangement with each other so that the electrical property on the bus bar is presented at different planar recesses of at least some of the second, third, fourth, fifth and sixth connector faces and further wherein the multi-face connector incorporates (7) a housing having two molded halves, each half incorporating a series of partitions for aligning and spacing the bus bars inserted within the housing while allowing the second, third, fourth, fifth and sixth connector terminals to move within recesses (91) formed by the molded halves;

whereby power is only received by the connector assembly through the first connector which is remotely positioned away from the multi-face connector, wherein the multi-face connector distributes and controls power to receptacles, switch or switch assemblies, and connectors, and wherein the second, third, fourth, fifth, and sixth connectors are unable to mate with the source of electrical power.

25. A connector assembly as defined in claim 24 wherein the power distribution function of the multi-face connector is:
(1) for the "S" face connector to only provide switched power to the fixture,
(2) for the "U" face connector to only provide unswitched power to the fixture, and (3) for the "M" face connectors (84 and 85) to distribute both unswitched and switched power;

and where three conductors comprise the series of conductors, a first conductor for ground, a second conductor for a single circuit power, and a third conductor for neutral, and wherein the two molded halves (71 and 72) have recesses (91) for receipt of second, third, fourth, fifth and sixth conductor terminals, and wherein the series of bus bars are arranged between the partitions of the molded halves; whereby switched power is available at the "S" and "M" face connectors for use with an interconnected fixture and downstream connector assemblies but only unswitched power is provided from the first connector to the multi-face connector thereby allowing isolation of previous switched power in a modular wiring system to this particular connector assembly.

26. A connector assembly as defined in claim 24 wherein the power distribution function of the multi-face connector is:
    (1) for the "S" face connector to only provide switched power to the fixture,
    (2) for the "U" face connector to only provide unswitched power to the fixture, and
    (3) for the "M" face connectors (84 and 85) to distribute both unswitched and switched power;

and where four conductors comprise the series of conductors, a first conductor for ground, a second conductor for a single circuit power, a third conductor for neutral, and a fourth conductor for switched power, and wherein the two molded halves (71 and 72) have recesses (91) for receipt of second, third, fourth, fifth and sixth connector terminals, and wherein the series of bus bars are arranged between the partitions of the molded halves; whereby both switched and unswitched power is available at the "S" and "M" face connectors with switched power transferrable to or from the first connector and the multi-face connector.

27. A connector assembly as defined in claim 24, wherein the power distribution function of the multi-face connector is:
    (1) for the "S" face connector and the "U" face connector to provide dual switched power of a single power circuit to an interconnected fixture,
    (2) for the "switch" face connector to electrically interconnect with a switch or switch assembly having two switches for individually controlling the dual switched power,
    (3) for the "M" face connector (84) to distribute both switched power lines without unswitched power, and
    (4) the "X" face connector (85) to distribute unswitched power and no more than one of the two switched power lines, and where three conductors comprise the series of conductors, a first conductor for ground, a second conductor for a single circuit power, and a third conductor for neutral, and wherein the two molded halves (71 and 72) have recesses (91) for receipt of second, third, fourth, fifth and sixth conductor terminals, and wherein the series of bus bars are arranged between the partitions of the molded halves.

28. A connector assembly as defined in claim 24, wherein the power distribution function of the multi-face connector is:
    (1) for the "S" face connector to provide switched power to a single ballast fixture and, for a dual ballast fixture, switched power to one ballast of the dual ballast fixture and unswitched power to the other ballast of the dual ballast fixture;
    (2) for the "U" face connector to provide only unswitched power to a single ballast fixture and, for a dual ballast fixture, unswitched power to one ballast of the dual ballast fixture and switched power to the other ballast of the dual ballast fixture,
    (3) for the "M" face connector (84) to distribute both switched and unswitched power of one power circuit, and
    (4) for the "X" face connector (85) to distribute only unswitched power of a second power circuit;

and where four conductors comprise the series of conductors, a first conductor for ground, a second conductor for a first power circuit, a third conductor for a second power circuit, and a fourth conductor for neutral, and wherein the two molded halves (71 and 72) have recesses (91) for receipt of second, third, fourth, fifth and sixth conductor terminals, and wherein the series of bus bars are arranged between the partitions (73 and 73') of the molded halves.

29. A connector assembly for a modular wiring system comprising:
    (A) a first connector having plural terminals of a first configuration for receipt of electrical power from a source of electrical power or from another connector assembly;
    (B) a series of conductors, each individually permanently terminating at one end with one of the first connector terminals; and
    (C) a multi-face connector (39) having at least
        (1) a second connector ("S" face 88) having plural terminals of a second configuration unable to mate with the source of electrical power for mating with a lighting fixture receptacle so as to provide at least switched power to the fixture,
        (2) a third connector ("U" face 86) having plural terminals of a second configuration unable to mate with the source of electrical power for mating with a lighting fixture receptacle so as to provide at least unswitched power to the fixture,
        (3) a fourth connector ("switch" face 87) having plural terminals of a second configuration unable to mate with the source of electrical power for mating with a switch or switch assembly for controlling the switched power,
        (4) a fifth connector ("M" face 84) having plural terminals of a second configuration unable to mate with the source of electrical power for mating with the first connector of a second connector assembly for passing power to the second connector assembly,
        (5) a sixth connector ("M" or "X" face 85) having plural terminals of a second configuration unable to mate with the source of electrical power for mating with the first connector of a third connector assembly for passing power to the third connector assembly,
        (6) means for permanently electrically terminating the second end of each conductor of the series of conductors and for electrically connecting these conductors to the second, third, fourth, fifth and sixth connector terminals so as to distribute the desired power to each of these connectors, said means including at least some electrical conductors terminating with some of the second, third, fourth, fifth and sixth connector terminals, at least some of these conductors interlaced in an electrically isolated, non-coplanar arrangement with each other;

(7) a housing having two molded halves (71 and 72) with recesses (91) for receipt of second, third, fourth, fifth and sixth connector terminals, and (8) an armored jacket mounted to the outside of the housing, the armored jacekt (74) having extending fingers (82), and wherein the first connector also has fingers (80) dimensioned for mating with at least some of the multi-face connector fingers (82) so that mechanical stress for mating connectors is passed through the armored jacket (74) of the multi-face connector without being imparted to the molded halves;

whereby power is only received by the connector assembly through the first connector which is remotely positioned away from the multi-face connector, wherein the multi-face connector distributes and controls power to receptacles, switch or switch assemblies, and connectors, and wherein the second, third, fourth, fifth, and sixth connectors are unable to mate with the source of electrical power.

30. A connector assembly for a modular wiring system comprising:

(A) a first connector having plural terminals of a first configuration for receipt of electrical power from a source of electrical power or from another connector assembly;

(B) a series of conductors, each individually permanently terminating at one end with one of the first connector terminals; and (C) a multi-face connector (39) having at least (1) a second connector ("S" face 88) having plural terminals of a second configuration unable to mate with the source of electrical power for mating with a lighting fixture receptacle so as to provide at least switched power to the fixture, (2) a third connector ("U" face 86) having plural terminals of a second configuration unable to mate with the source of electrical power for mating with a lighting fixture receptacle so as to provide at least unswitched power to the fixture, (3) a fourth connector ("Switch" face 87) having plural terminals of a second configuration unable to mate with the source of electrical power for mating with a switch or switch assembly for controlling the switched power, (4) a fifth connector ("M" face 84) having plural terminals of a second configuration unable to mate with the source of electrical power for mating with the first connector of a second connector assembly for passing power to the second connector assembly, (5) a sixth connector ("M" or "X" face 85) having plural terminals of a second configuration unable to mate with the source of electrical power for mating with the first connector of a third connector assembly for passing power to the third connector assembly, (6) means for permanently electrically terminating the second end of each conductor of the series of conductors and for electrically connecting these conductors to the second, third, fourth, fifth, and sixth connector terminals so as to distribute the desired power to each of these connectors;

(7) a housing having two molded halves (71 and 72) with recesses (91) for receipt of second, third, fourth, fifth and sixth connector terminals, and (8) an armored jacket mounted to the outside of the housing, the armored jacket (74) having extending fingers (82) about each of the connectors of the multi-face connector, and wherein the lighting receptacle and switch or switch assembly has components for mating with the fingers associated with the connector to which the receptacle and switch or switch assembly mate, and further wherein the first connector also has fingers (80) dimensioned for mating with at lest some of the multiface connector fingers (82) so that mechanical stress for mating connectors is passed through the armored jacket (74) of the multi-face connector without being imparted to the molded halves;

whereby power is only received by the connector assembly through the first connector which is remotely positioned away from the multi-face connector, wherein the multi-face connector distributes and controls power to receptacles, switch or switch assemblies, and connectors, and wherein the second, third, fourth, fifth, and sixth connectors are unable to mate with the source of electrical power.

* * * * *